United States Patent
Aoki et al.

(10) Patent No.: US 7,373,459 B2
(45) Date of Patent: May 13, 2008

(54) CONGESTION CONTROL AND AVOIDANCE METHOD IN A DATA PROCESSING SYSTEM

(75) Inventors: Hideo Aoki, Yokohama (JP); Takashi Nishikado, Ebina (JP); Daisuke Yokota, Yokohama (JP); Yasuhiro Takahashi, Kawasaki (JP); Fumio Noda, Kodaira (JP); Yoshiteru Takeshima, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 266 days.

(21) Appl. No.: 11/189,758

(22) Filed: Jul. 27, 2005

(65) Prior Publication Data

US 2006/0031567 A1    Feb. 9, 2006

Related U.S. Application Data

(63) Continuation of application No. 10/183,519, filed on Jun. 28, 2002, now Pat. No. 6,931,435.

(30) Foreign Application Priority Data

Jun. 28, 2001    (JP)    ............................. 2001-196738

(51) Int. Cl.
  *G06F 12/08*    (2006.01)
  *G06F 13/16*    (2006.01)
(52) U.S. Cl. ...................... 711/134; 711/145; 711/151; 711/216; 711/163; 709/203
(58) Field of Classification Search .................... None
  See application file for complete search history.

(56) References Cited

U.S. PATENT DOCUMENTS 6,233,606 B1    5/2001    Dujari ......................... 709/213
6,584,548 B1    6/2003    Bourne et al. ............... 711/134
2003/0191812 A1*    10/2003    Agarwalla et al. .......... 709/217

FOREIGN PATENT DOCUMENTS

| JP | 11-331255 | 11/1999 |
| JP | 2000-298634 | 10/2000 |
| JP | 2002-152258 | 5/2002 |

* cited by examiner

*Primary Examiner*—B. James Peikari
(74) *Attorney, Agent, or Firm*—Mattingly, Stanger, Malur & Brundidge, P.C.

(57) ABSTRACT

A congestion control and avoidance method including a method check step of determining whether the request contents is cacheable or uncacheable on the basis of the request inputted from the client terminal, a first Uniform Resource Identifier (URI) check step of, when it is determined that the request contents is cacheable in the method check step, checking a URI included in the request from the client terminal to determine whether the request contents is cacheable or uncacheable, a first URI hash search step of, when it is determined that the request contents is cacheable based on determination of the first URI check step, searching a URI hash to determine to execute any of regular caching, priority caching and access limitationing operation, and a step of executing any of the regular caching, priority caching and access limitationing operation according to determination in the first URI hash search step.

9 Claims, 26 Drawing Sheets

URI
EX.: http://www ~ /INDEX.HTML

CONTROL TYPE
EX.: REGULAR CACHING

ACCESS COUNTER
EX.: 3

RESTRICTION EXECUTION FLAG
CACHE ENTRY INFORMATION

URI ENTRY INFORMATION
  EX.: URI ENTRY RELATING TO http://www ~ /INDEX.HTML

CACHE ENTRY TYPE
  EX.: REGULAR CACHING

CACHING STATE
  EX. BEING CACHED

OWNER SESSION
  EX.. SESSION NO. N

RESPONSE WAIT SESSION LIST
  EX.. SESSION NOS. X AND Y

CACHING DATA INFORMATION

CACHE ENTRY INFORMATION
    EX.: CACHE ENTRY OF HTTP://WWW ~ /INDEX.HTML

CACHING DATA TYPE
  EX. REGULAR CACHING

THE NUMBER OF SESSIONS REFERRING TO CACHING DATA
  EX.: 3

NEXT CACHING DATA INFORMATION

CACHING DATA

URI http: //www ~ /a.cgi?a1=arg1&a2=arg2 http: //www ~ /a.cgi

URI PROCESSING

FIG.17

```
HTTP/1.1 200 OK

Date: Thu,  08 Feb 2001 13:31:07 GMT

Server: www server version 1.0

Last-Modified: Thu, 30 Nov 2000 07:04:44 GMT

Accept-Ranges: bytes

Content-Length: xxxx

Connection: close

Content-Type: text/html

<html>

<head>

<title>Web Page </title>

</head>

<body>

...

</body>

</html>
```
— 85

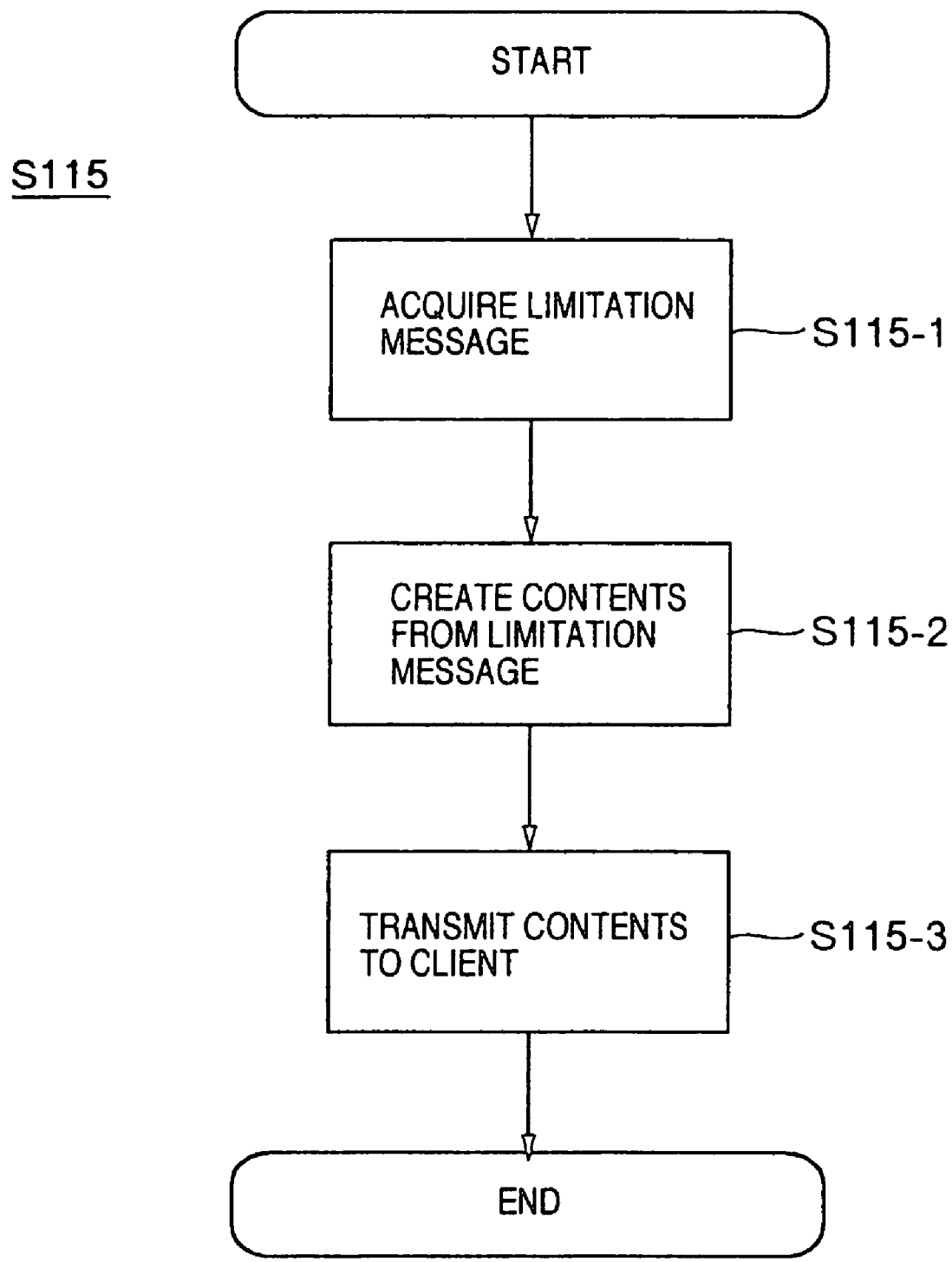

REQUESTED CONTENTS CANNOT BE AVAILABLE

FIG.23A

```
┌─────────────────────────────────────────────┐
│  ACCESS LATER BECAUSE WE ARE NOW IN CONGESTION │
└─────────────────────────────────────────────┘
                        95
```

FIG.23B

```
<?xml version="1.0" encoding="Shift-JIS"?>
<!DOCTYPE html
PUBLIC "-//W3C//DTD XHTML 1.0 Strict//EN" "DTD/xhtml1-
strict. dtd">
<html xmlns="http:// www.w3.org/ 1999/xhtml" xml:lang="ja" lang="ja">
<head> </head>
<body>
<p> ACCESS LATER BECAUSE WE ARE NOW IN CONGESTION </p>
</body>
</html>
```
97

FIG.25

```
URI
  EX.: http://www ~ /index.html

CONTROL TYPE
  EX.: REGULAR CACHING

ACCESS COUNTER
  EX.: 3 ACCESSES

RESTRICTION EXECUTION FLAG
  EX.: NO RESTRICTION

CACHE ENTRY INFORMATION

ACCUMULATED CONNECTION NUMBER
  EX.: 17

AVERAGE PROCESSING TIME
  EX.: 500MS

THE NUMBER OF RESTRICTION START CONNECTIONS
  EX.: 64 ACCESSES

THE NUMBER OF RESTRICTION END CONNECTIONS
  EX.: 32 ACCESSES

RESTRICTION START TIME
  EX.: 2000/07/01/00/00/00
```

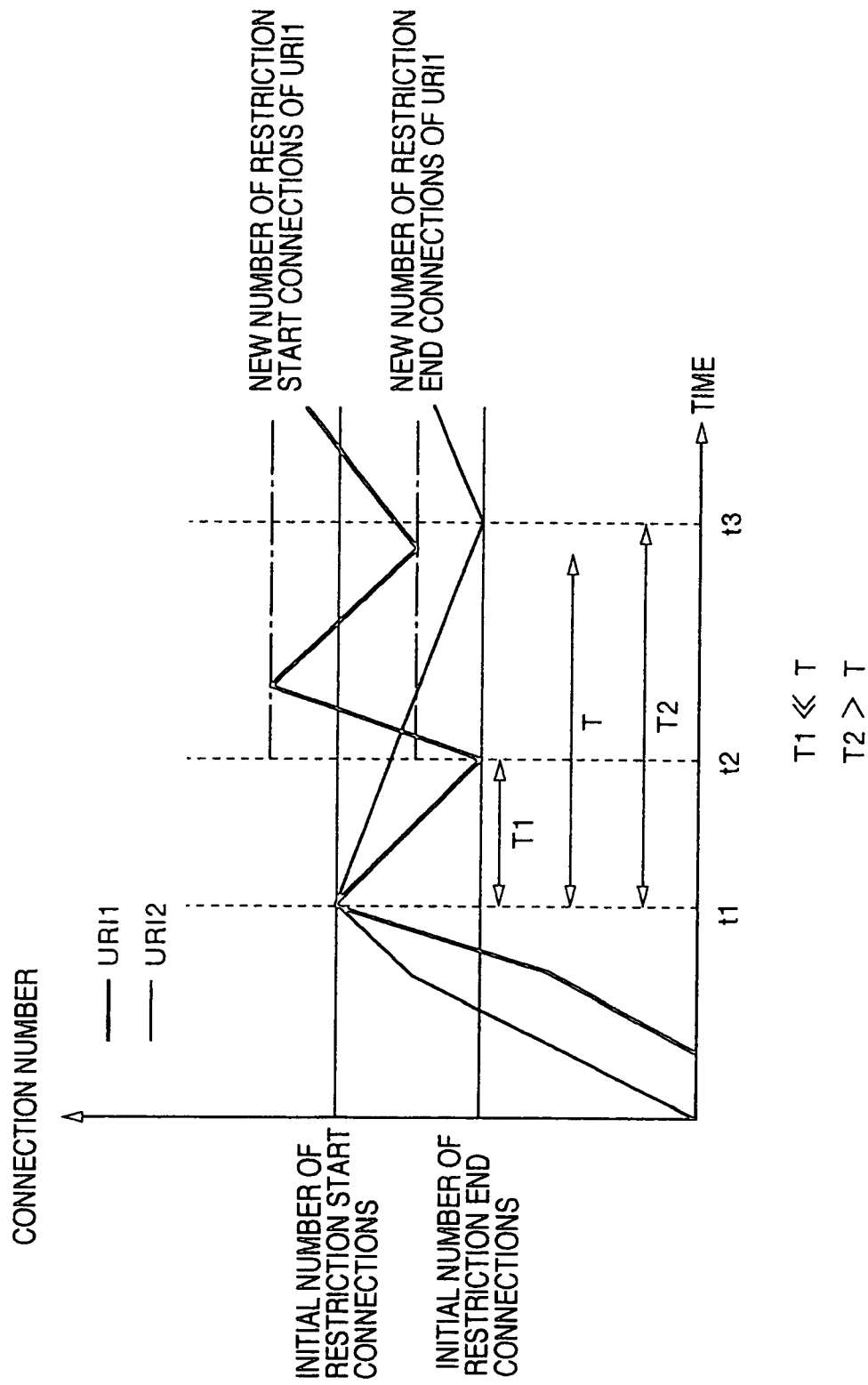

CONGESTION CONTROL AND AVOIDANCE METHOD IN A DATA PROCESSING SYSTEM

The present application is a continuation of application Ser. No. 10/183,519 filed Jun. 28, 2002, now U.S. Pat. No. 6,931,435, the contents of which are incorporated herein by reference.

BACKGROUND OF THE INVENTION

The present invention relates to a congestion control and avoidance method in a data processing system and more particularly, to a congestion control and avoidance for data traffic between a client and a server in a communication network.

As the Internet has spread quickly, services such as ticket reservation, bank and security transaction, which have been conventionally carried out at the windows of the banks or securities companies, are recently offered via the Internet. Further, since communication technologies are advanced, such an environment has been prepared that people can enjoy various services not only from homes or offices but also from portable phones or the like.

In a conventional method wherein clients demand their service requests directly to a server, clients' requests are likely to become congested at the server. As a result, there will occur such a problem that the capacity of a communication line or the capability of the server cannot cope with requests from many users or clients. Thus, even when a user issues a request many times to the server, sometimes it is hard for the user to receive its response from the server, depending on a period of time or an access destination.

In general, such a problem can be improved by installing a web proxy device. In this case, a request from a client is processed by the web proxy device. Since the web proxy device is provided with a memory (caching module) for storing (caching) a part of past communication contents, the web proxy device can process a request relating to the communication contents stored therein without connecting the request to the server. The web proxy device is use in many communication systems because of its effectiveness.

At present, a large scale web proxy apparatus is usually installed in a communication system capable of handling about 10,000,000 users. In such a communication system, requests to the large scale web proxy apparatus are excessively congested. When such request congestion takes place, a communication line becomes heavy or congested and the load of the apparatus is increased, which results in that users can less enjoy services offered by the communication system. In addition, when such excessive congestion is continued, a trouble (congestion) may take place in the large scale web proxy apparatus, thus leading to stoppage of the operation of the apparatus. Since the stoppage of the operation of the large scale web proxy apparatus means that the apparatus cannot function as a communication system, all the users utilizing the communication system cannot receive the services.

SUMMARY OF THE INVENTION

In view of the above respects, it is an object of the present invention to avoid or lighten a failure generated in a web proxy device of mainly a large scale.

In order to solve the above problems, in accordance with the present invention, a web proxy device has a function of changing the processing method of a request depending on communication contents demanded by each user. In order to avoid the increase of the load of the web proxy device, this function is realized not by providing a new processing module but by utilizing a memory (caching module) already present in the proxy device.

The web proxy device estimates the communication contents currently being carried out by the proxy device and the state of the proxy device, and determines a processing method for a request newly received based on the estimation result. Thus, the proxy device can detect omittable communication to reduce the amount of communication, thereby avoiding the proxy device from being put in its congested state. Further, a kind of communication processing which becomes one of causes of the congestion can be processed in a manner different from an ordinary processing. For example, such a kind of communication contents causing a congestion are preferentially stored in a caching memory, whereby the web proxy device can be avoid from being put in the congested state.

The web proxy device detects a communication approaching its congested state in the process of determining a control method for a request. With regard to the communication close to the congested state, the proxy device does not process the communication until the congestion is improved and announces to a user that the user should refrain from the communication. As a result, deterioration of the congestion state can be prevented and it can be avoided that the web proxy device becomes failure and is put in its unusable state.

The large scale web proxy apparatus according to the present invention receives requests transmitted from users at a load balancing device, which then transmits the requests to a plurality of web proxy devices installed in the large scale web proxy apparatus in a distributed manner. In the web proxy device, a caching module discriminates the user's request and determines a control to be carried out by the web proxy device. There are four types of congestion control, that is, request aggregation, priority caching, access limitation, and access monitoring.

When a plurality of users issue requests of the same cacheable service and the web proxy device is required to communicate with the server for the service, the web proxy device aggregates the plural requests into a single request and communicates with the server relating to the single request. Thus the amount of communication between the web proxy device and server can be reduced. Further, since the number of requests to the server can be decreased, the load of the server can be prevented from increasing. Furthermore, the congestion of the web proxy device to the server can be avoided and the server load can be reduced. As a result, the web proxy device can quickly respond to the requests from users.

A web proxy device according to the present invention provides a method for priority caching of a specific service. Utilizing this method, a communication carrier can register such a service causing the congestion so that the service is cached with a higher priority. In the conventional method, since the distinction between priority and non-priority is not given to data to be cached, it has been impossible to hold important data in the web proxy device. According to the method of the present invention, however, the web proxy device can hold data required by the user. Thus, the user can receive more services at a high speed.

The web proxy device of the present invention provides a method for inhibiting users from utilizing a specific service. Utilizing this method, the communication and is considered a service to not to be offered by the communication system to the users. For a request relating to such a service not to be offered, the web proxy device issues to the users a reply informing them that the web proxy device cannot offer the service and terminates the operation of the request.

Since the conventional web proxy device does not have an inhibiting function, the device wastefully uses its resource in communication with the server. Further, there may occur a situation that the user must wait for a long time for the requested service without knowing that the service will not be available or the user tries to communicate with the web proxy device for the service many times. By using the method of the present invention, the user can quickly know the fact that the service cannot be offered.

With respect to a request of a service for which the number of requests to be connected can be confirmed, the web proxy device of the present invention measures the connection number. When receiving too many requests for an identical service which cannot be treated as a request being aggregated, the web proxy device can process the requests exceeding a predetermined number as unconnectable requests. At this time, the web proxy device informs such users of the reason why the users' requests cannot be connected. For this reason, a load of the server can be reduced and the congestion of the web proxy device can be avoided. Further, the users can grasp the service state without causing such a phenomenon that the users wait for a long time for it the service in spite of the fact that the requested service cannot be available.

In accordance with a first aspect of the present invention, the above problems can be solved by providing a congestion control and avoidance method in a communication forwarding device provided between a client terminal and a server device for transmitting, according to a request from the client terminal, request contents already stored at the time of a cache hit and for receiving the request contents from the server device and transmitting the request contents to the client terminal at the time of a cache mishit or when the request utilizes no cache. In this aspect, the method comprises a method check step of determining whether the request contents is cacheable or uncacheable on the basis of the request from the client terminal; a first Uniform Resource Identifier (URI) also known as a Uniform Resource Location (URL) check step of, when it is determined that the request contents is cacheable in the method check step, checking a URI included in the request from the client terminal to determine whether the request contents is cacheable or uncacheable; a first URI hash search step of, when it is determined that the request contents is cacheable based on determination of the first URI check step, searching a URI hash to determine to execute any of regular caching, priority caching and access limitation operation; and a step of executing any of the regular caching, priority caching and access limitation operation according to determination in the first URI hash search step.

In accordance with a second aspect of the present invention, the above problems can be solved by providing a congestion control and avoidance method in a communication forwarding device provided between a client terminal and a server device for transmitting, according to a request from the client terminal, request contents already stored at the time of a cache hit and for receiving the request contents from the server device and transmitting the request contents to the client terminal at the time of a cache mishit or when the request utilizes no cache. In this aspect, the method comprises a method check step of determining whether the request contents is cacheable or uncacheable on the basis of the request from the client terminal; a second URI check step of, when it is determined that the request contents is uncacheable in the method check step, checking a URI included in the request from the client terminal; a second URI hash search step of searching a URI hash to determine any of access limitation and access monitoring operation; a step of executing any of the access limitation and access monitoring operation according to determination in the second URI hash search step.

In accordance with a third aspect of the present invention, the above problems can be solved by providing a congestion control and avoidance method in a communication forwarding device provided between a client terminal and a server device for transmitting, according to a request from the client terminal, request contents already stored at the time of a cache hit and for receiving the request contents from the server device and transmitting the request contents to the client terminal at the time of a cache mishit or when the request utilizes no cache. In this aspect, the method comprises a method check step of determining whether the request contents is cacheable or uncacheable on the basis of the request from the client terminal; a first URI check step of, when it is determined that the request contents is cacheable in the method check step, checking a URI included in the request from the client terminal to determine whether the request contents is cacheable or uncacheable; a first URI hash search step of, when it is determined that the request contents is cacheable based on determination of the first URI check step, searching a URI hash to determine to execute any of regular caching and priority caching operation; a second URI check step of, when it is determined that the request contents is uncacheable in the method check step, checking a URI hash to determine to execute any of access limitation and access monitoring operation; a uncacheable based on determination of said first URI check step or is moved through said second URI check step, searching a URI hash to determine any of access limitation and access monitoring operation; and a step of executing any of the regular caching, priority caching, access limitation and access monitoring operation according to determination in the first or second URI hash search step.

Other objects, features and advantages of the invention will become apparent from the following description of the embodiments of the invention taken in conjunction with the accompanying drawings.

BRIEF DESCRIPTION OF THE DRAWINGS

FIGS. 10A and 10B are diagrams for explaining the internal data structure of a shared memory 55;

FIG. 11 is another diagram for explaining the internal data structure of a shared memory 55;

FIG. 17 is a diagram for explaining an HTTP response of the web communication device;

FIG. 20 is a flowchart showing an access limitation process;

FIGS. 23A and 23B show diagrams for explaining a restriction message and restriction contents, respectively;

FIG. 25 is a diagram showing dynamic changes in a restriction start connection number and restriction end a connection number; and FIG. 26 is a chart for explaining the dynamic changes in the restriction start and end connection numbers.

DETAILED DESCRIPTION OF THE EMBODIMENT

Figure 1:
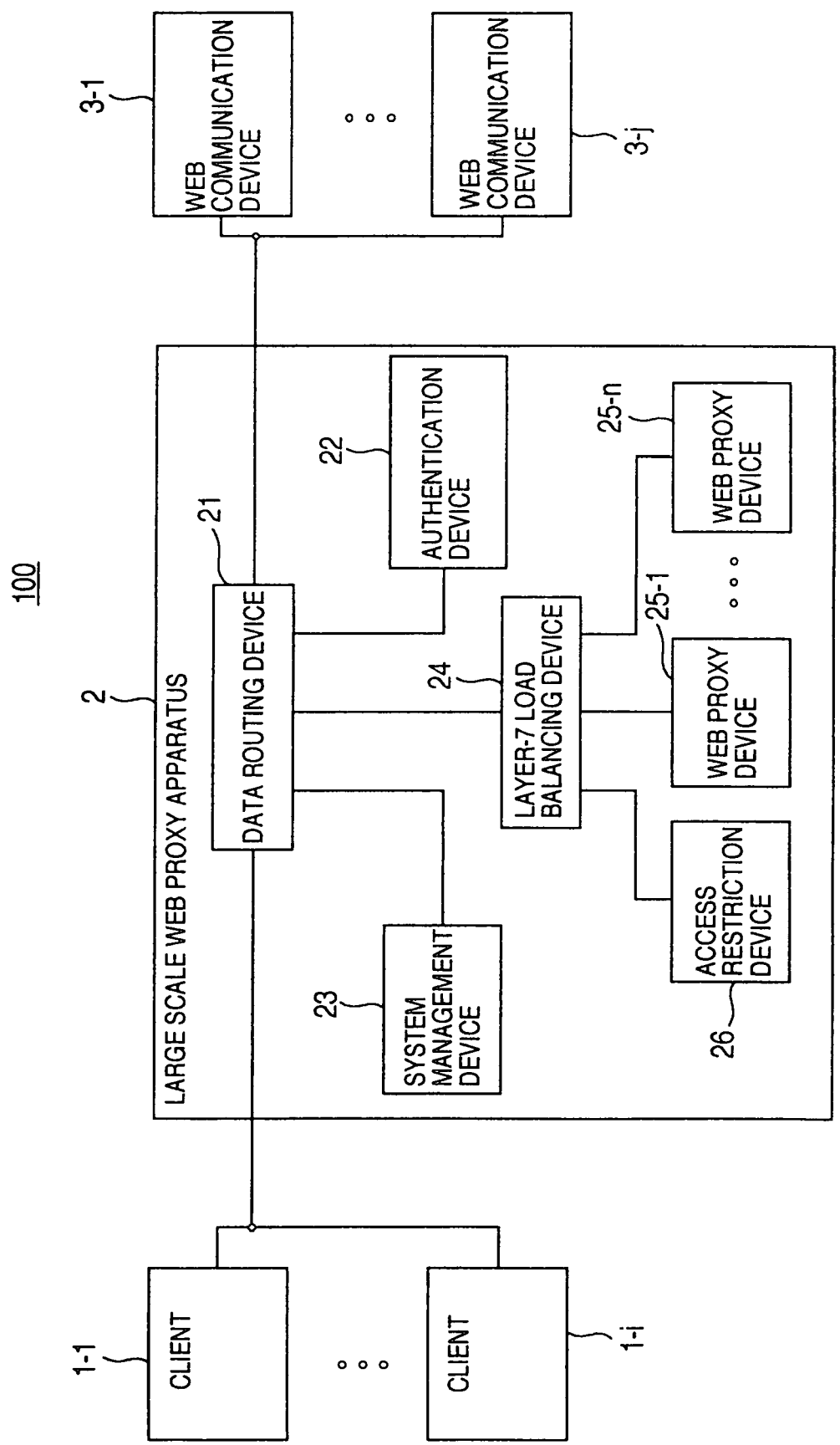
FIG. 1 is an arrangement of a communication system.

A. Schematic Hardware Arrangement:

FIG. 1 shows an arrangement of a communication system.

A communication system 100 includes, as an example, client terminals 1-1 to 1-$i$, a large scale web proxy apparatus 2, and web communication devices 3-1 to 3-$j$. Each of the client terminals 1-1 to 1-$i$ is a user device, for example, for issuing a request to acquire web contents, transmitting or receiving data or for displaying it on its display screen. The web communication devices 3-1 to 3-$j$, which, for example, transmit web contents according to requests from the client terminals 1-1 to 1-$i$. Each of the web communication devices 3-1 to 3-$j$ stores therein contents data as the upper limit of its disk capacity. Although explanation will be made in connection with, mainly, a large scale web proxy apparatus in the present embodiment, the present invention is not limited to the specific example but may be applied to a suitable-scale web proxy device.

The large scale web proxy apparatus 2 has, for example, a data routing device 21, an authentication device 22, a system management device 23, a layer-7 load balancing device 24, web proxy devices 25-1 to 25-$n$, and an access restriction device 26.

The data routing device 21, which is, for example, a device for relaying data transfer between the web communication devices 3-1 to 3-$j$ and client terminals 1-1 to 1-$i$ located inside or outside the large scale web proxy apparatus 2 transmits a send/receive data packet to a destination device specified in the header of the packet. The authentication device 22 is a device for authenticating that a relay service offered by the large scale web proxy apparatus 2 is for the service between previously registered (authorized) client terminals 1-1 to 1-$i$ and authorized web communication devices 3-1 to 3-$j$. The authentication device 22 also has a database having user information and service information registered therein. The system management device 23 is, for example, a device for centralized control of the devices within the large scale web proxy apparatus 2.

The layer-7 load balancing device 24, for example, distributes web contents acquisition requests from a plurality of client terminals 1-1 to 1-$i$ to a plurality of web proxy devices 25-1 to 25-$n$ to balance the load of the web proxy processing. And the layer-7 load balancing device 24 functions to interpret a destination or the like described in the header of a send/receive packet or in the send header of web contents request, determine distribution paths and transmit the received data packet to the determined distribution paths. The web proxy devices 25-1 to 25-$n$ are devices, for example, for accepting web contents acquisition requests from the client terminals 1-1 to 1-$i$ to forward the requests to the web communication devices 3-1 to 3-$j$ or to forward data transfer between the client terminals 1-1 to 1-$i$ and web communication devices 3-1 to 3-$j$. The access restriction device 26 is used, for example, when many web contents acquisition requests to the large scale web proxy apparatus 2 are congested in a short time, to restrict the amount of access (acquisition request amount) in such a manner as not to exceed the processing limit of the large scale web proxy apparatus 2.

Figure 2:
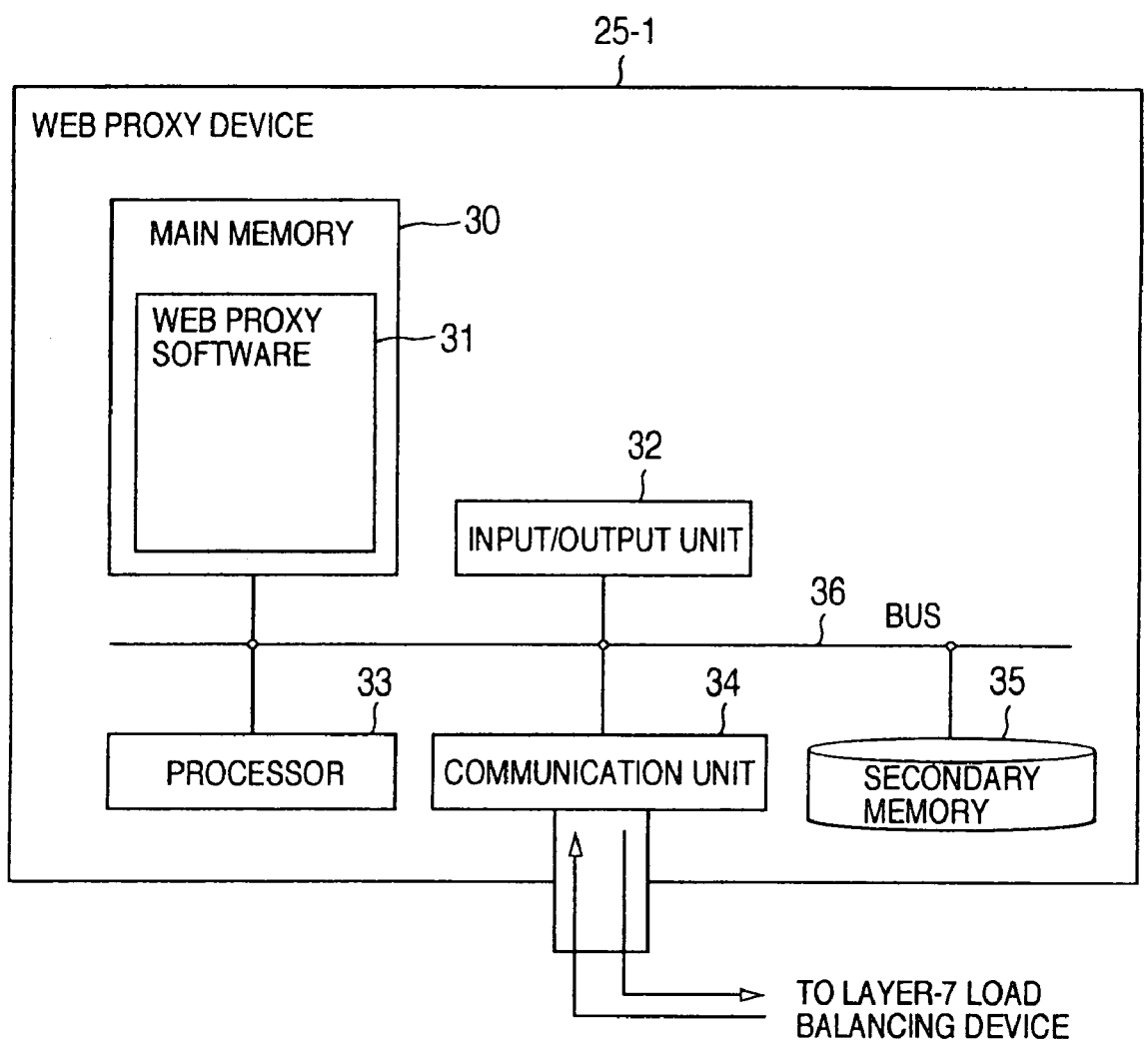
FIG. 2 is an arrangement of a web proxy device.

Shown in FIG. 2 is an arrangement of the web proxy device.

The web proxy device 25-1 has, for example, a main memory 30, web proxy software 31 stored in the main memory 30, an input/output unit 32, a processor 33, a communication unit 34 for transmitting or receiving a data packet to or from the layer-7 load balancing device 24, a secondary memory 35, and a bus 36 wired between these components.

The secondary memory 35, which is a device (non-volatile memory) such as a magnetic disk, stores a program and various sorts of setting files. The secondary memory 35 plays roles (1), (2) and (3) which follow.

(1) The secondary memory 35 stores OS (operating system) data of the web proxy device 25-1 and, when the web proxy device 25-1 starts to operate, the data is loaded in the main memory 30.

(2) The secondary memory 35 stores various sorts of application programs (data/setting files) to be run on the OS and, when the application programs are started, the programs are loaded in the main memory 30.

(3) The secondary memory 35 stores the web contents data to be relayed by the web proxy device 25-1 as caching data.

In this connection, the web proxy device processes a request from a client in processing units of so-called a session (one request corresponding to one session). When the session uses the cache, the web proxy device refers the cache entry. When the session communicates with the server for caching, the web proxy device needs to lock the cache entry. This congestion control and avoidance method is carried out during each session processing operation.

Figure 3:
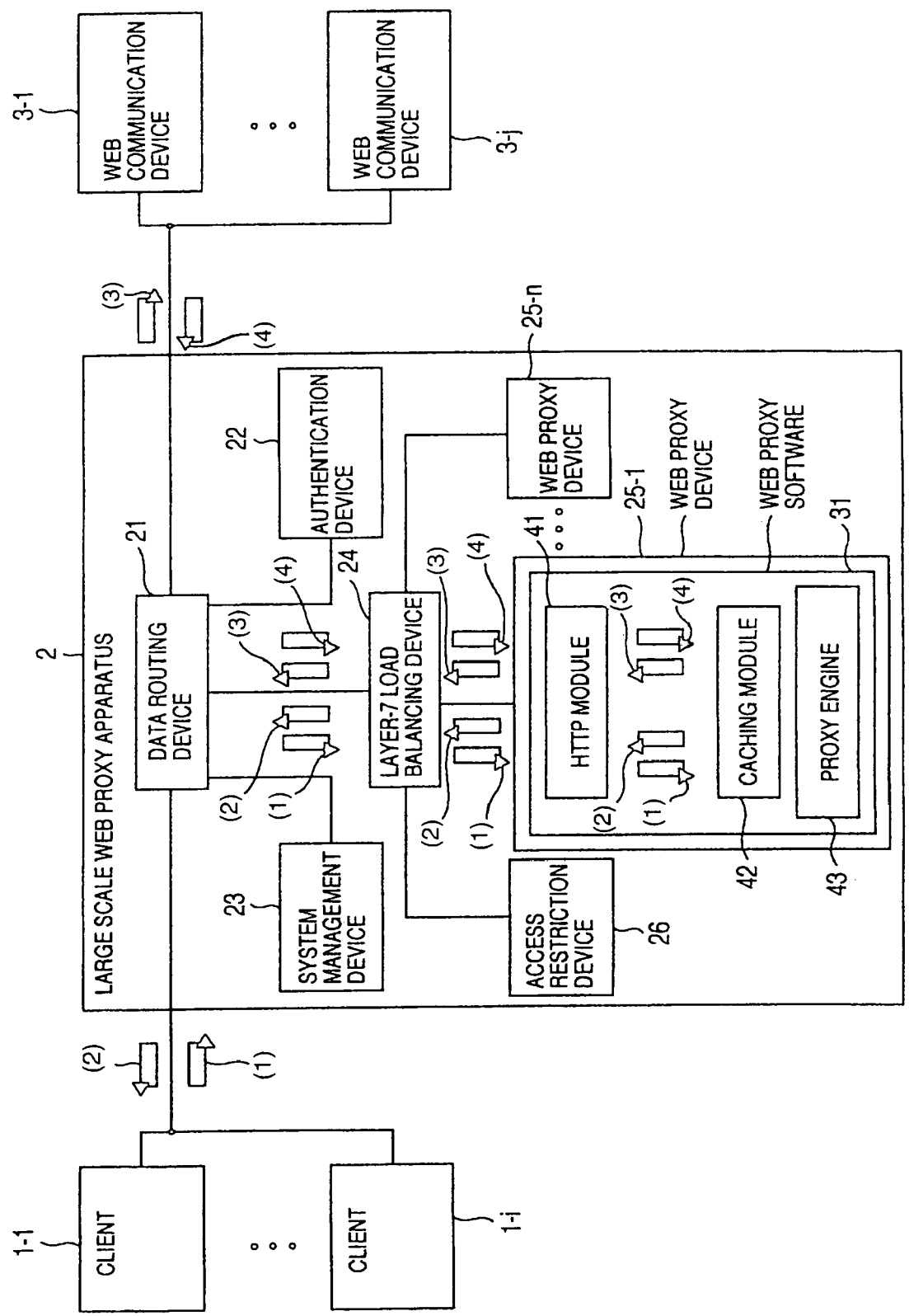
FIG. 3 is a diagram for explaining how a large scale web proxy apparatus performs data transmission and reception.

FIG. 3 is a diagram for explaining how the large scale web proxy apparatus transmits or receives data. In the figure, components having the same functions as those of the aforementioned components are denoted by the same reference numerals or symbols, for the convenience of explanation. Further, since the web proxy devices 25-1 to 25-n have each an identical structure, explanation will be made in this case in connection with only the web proxy device 25-1.

The web proxy software 31 is previously stored in the web proxy device 25-1, and includes, as an example, an HTTP module 41, a caching module 42 and a proxy engine 43.

In the drawing, (1) denotes a request of the client terminals 1-1 to 1-i, (2) denotes a response of the web proxy software 31, (3) denotes a request of the web proxy software 31, and (4) denotes a response of the web communication devices 3-1 to 3-j, respectively.

Figure 4A:
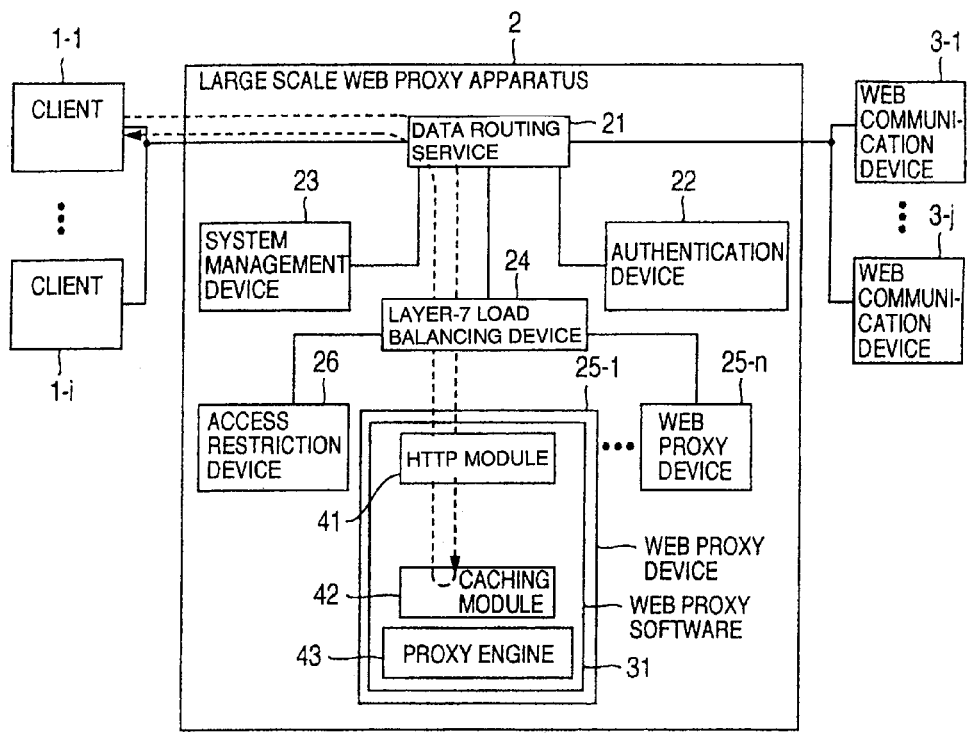
FIGS. 4A and 4B show a diagram and a sequence for explaining when the large scale web proxy apparatus is in its cache hit mode, respectively.
Figure 4B:
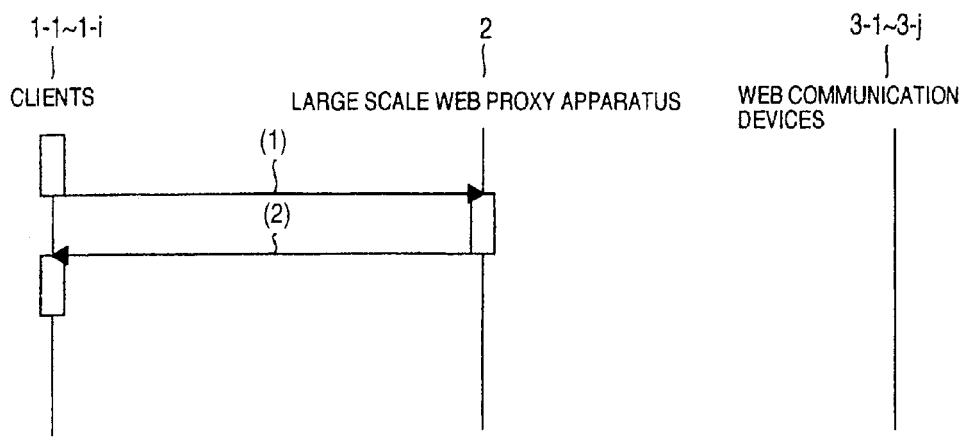

In the cache hit mode, only the data (1) and (2) flows through the communication line (refer to FIG. 4A and FIG. 4B). In the cache mishit, data flows through the communication line in an order of the data (1), (3), (4) and (2) (refer to FIG. 5A and FIG. 5B).

Explanation will be briefly made as to the respective processes which follow.

(1) Client Request:

When a client request is sent from the client terminals 1-1 to 1-i, the large scale web proxy apparatus 2 receives the client request. The data routing device 21 in the large scale web proxy apparatus 2 transfers the request to the layer-7 load balancing device 24, which in turn sends it associated one (the web proxy device 25-1 in this case) of the web proxy devices. In the web proxy software 31 within the web proxy device 25-1, the HTTP module 41 and caching module 42 receive the client request through the proxy engine 43.

(2) Response of Web Proxy Software:

Next the web proxy device 25-1 after receiving the client request analyzes already stores a web content corresponding to the client request in the cache, then the web proxy device 25-1 transmits the contents to the client terminal 1-1 via the layer-7 load balancing device 24 and data routing device 21.

(3) Response of Web Proxy Software:

Meanwhile, when the web proxy device 25-1 fails to store the web content corresponding to the client request in the cache and/or when there is an instruction indicative of inhibition of use of the cache to the client request, the web proxy device 25-1 forwards information about the client request to corresponding one of the web communication devices 3-1 to 3-j via the layer-7 load balancing device 24 and data routing device 21.

(4) Response of Web Communication Device:

Associated one of the web communication devices 3-1 to 3-j, when receiving the client request, issues the web content corresponding to the client request, to the client terminal via the data routing device 21. Further, the data routing device 21 transmits the communication contents or web content to the web proxy device 25-1 via the layer-7 load balancing device 24. The web proxy device 25-1 caches the web content in the caching module 42.

FIGS. 4A and 4B show a diagram and a sequential diagram for explaining the operation of the large scale web proxy apparatus 2 in the cache hit mode, respectively. In this case, the sequential diagram corresponds to arrows shown by dotted lines in the upper diagram.

A request signal (data (1)) from the client terminals 1-1 to 1-i is first applied to the caching module 42 via the data routing device 21 and layer-7 load balancing device 24 in the large scale web proxy apparatus 2 and via the HTTP module 41 in the web proxy software 31, and determined therein as cache hit. Next, the web page is transmitted as a response signal (data (2)) of the web proxy software 31 again via the caching module 42, HTTP module 41, layer-7 load balancing device 24 and data relay device 21 to the client terminals 1-1 to 1-i.

Figure 5A:
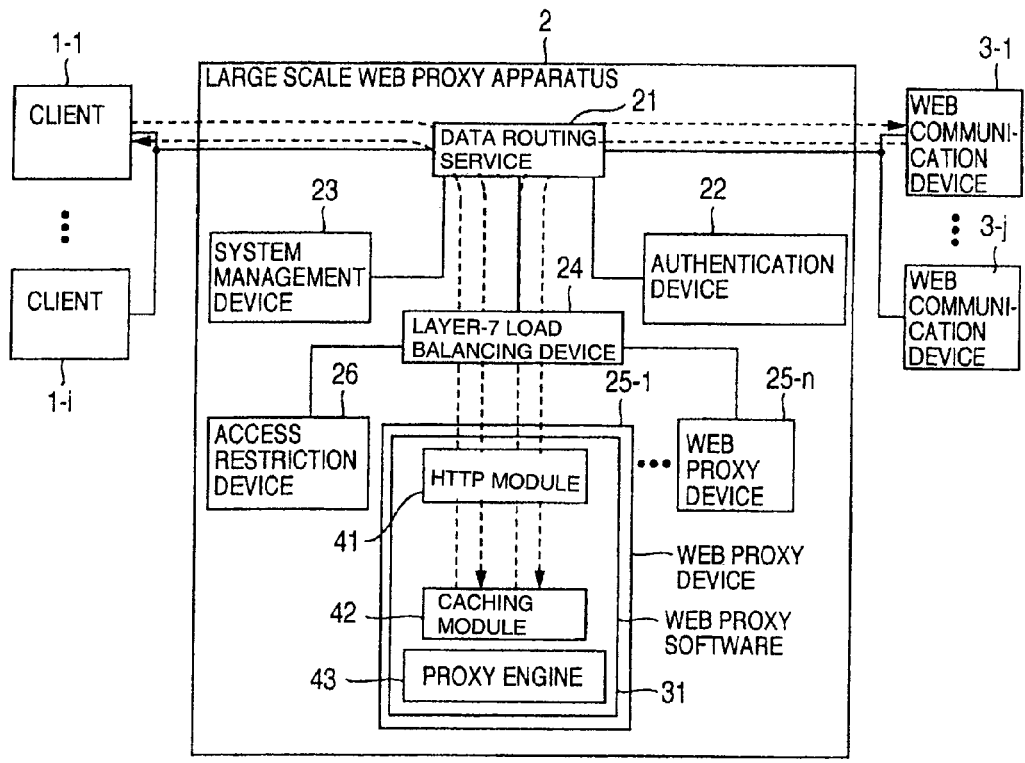
FIGS. 5A and 5B show a diagram and a sequence for explaining when the large scale web proxy apparatus is in its cache mishit mode, respectively.
Figure 5B:
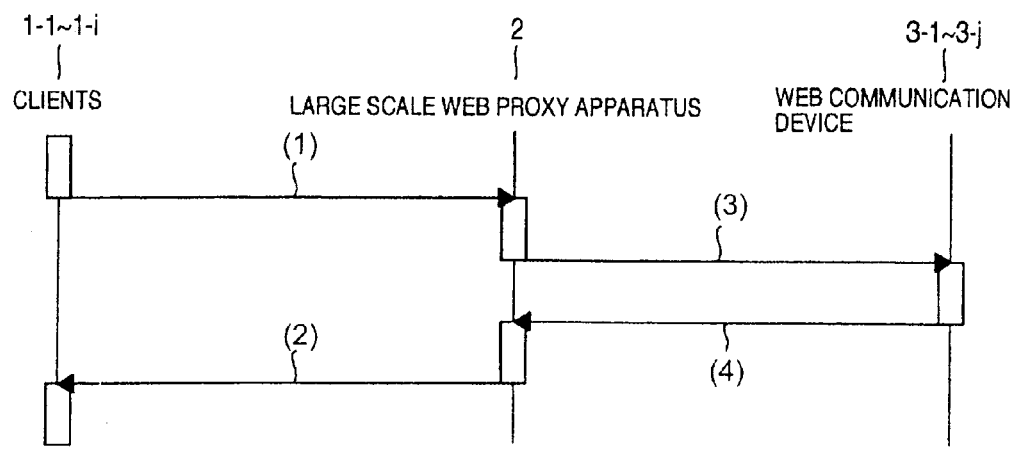

FIGS. 5A and 5B show a diagram and a sequential diagram for explaining the operation of the large scale web proxy apparatus 2 in the cache mishit mode, respectively. In this case, the sequential diagram corresponds to arrows shown by dotted lines in the upper diagram.

The request signal (data (1)) from the client terminals 1-1 to 1-i is first applied to the caching module 42 via the data routing device 21 and layer-7 load balancing device 24 in the large scale web proxy apparatus 2 and via the HTTP module 41 in the web proxy software 31, and determined therein as cache mishit. Next, a request signal (data (3)) of the web proxy software 31 is transmitted to the web communication devices 3-1 to 3-j via the caching module 42, HTTP module 41, layer-7 load balancing device 24 and data routing device 21. In response to it, further, a response signal (data (4)) including the web content of the web communication devices 3-1 to 3-j is applied to the caching module 42 via the data routing device 21 and layer-7 load balancing device 24 in the large scale web proxy apparatus 2 and via the HTTP module 41 in the web proxy software 31. Next, the web page is transmitted as a response signal (data (2)) of the web proxy software 31 again the caching module 42, HTTP module 41, layer-7 load balancing device 24 and data routing device 21 to the client terminals 1-1 to 1-i.

Figure 6A:
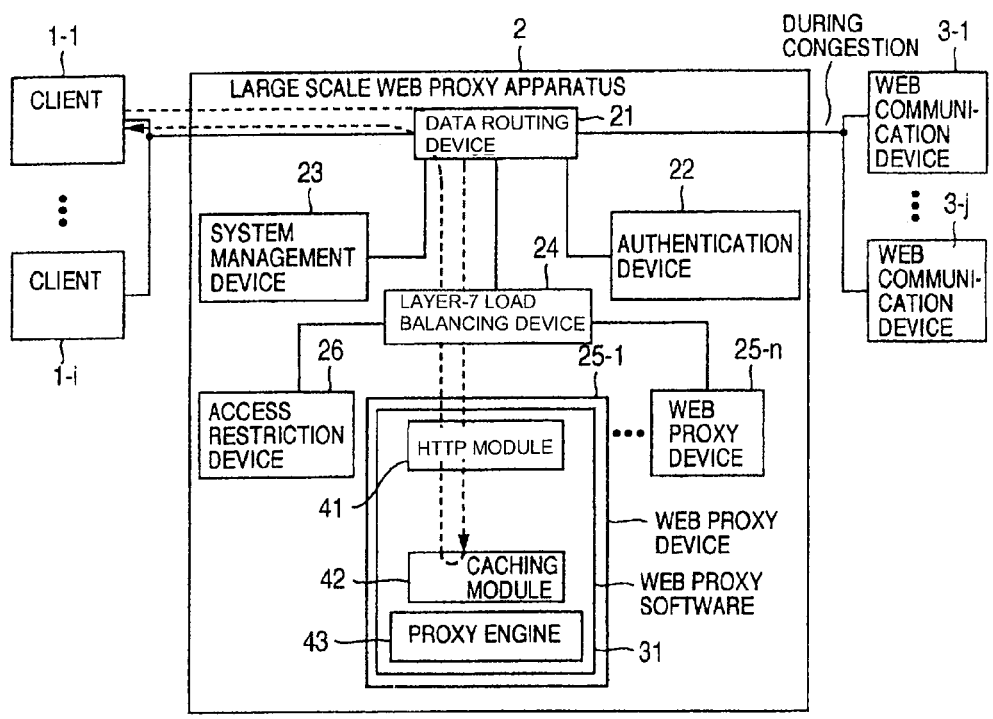
FIGS. 6A and 6B show a diagram and a sequence for explaining when the large scale web proxy apparatus is in its congestion mode, respectively.
Figure 6B:
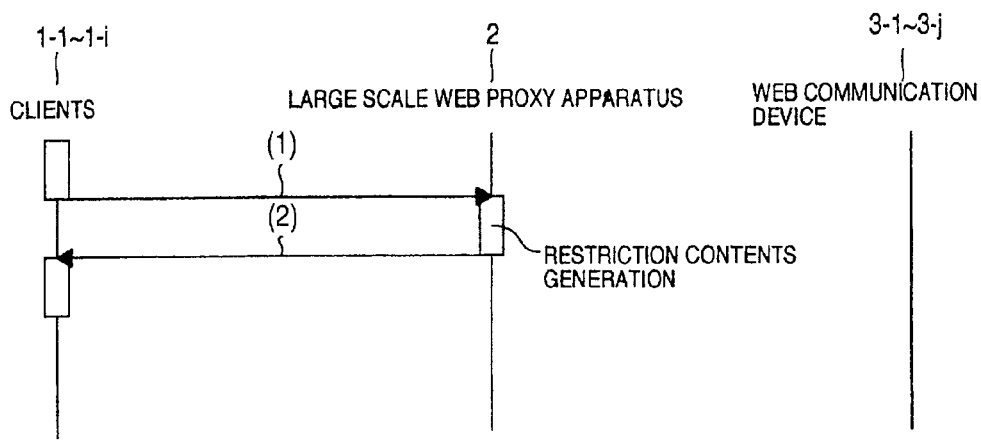

FIGS. 6A and 6B show a diagram and a sequential diagram for explaining the operation of the large scale web proxy apparatus 2 in the congestion mode, respectively. In this case, the sequential diagram corresponds to arrows shown by dotted lines in the upper diagram.

A request signal (data (1)) from the client terminals 1-1 to 1-i is first applied to the caching module 42 via the data routing device 21 and layer-7 load balancing device 24 in the large scale web proxy apparatus 2 and via the HTTP module 41 in the web proxy software 31.

When the web communication devices 3-1 to 3-j are in the congestion mode for example, the web proxy software 31 generates restriction contents. In this case, if requests exceeding a predetermined number are concentrated on the web page as an example, then it is determined as congested. The restriction contents, which is included in the data (2), is transmitted to the client terminals 1-1 to 1-i. At this time, the restriction contents is transmitted as a response signal (data (2)) of the web proxy software 31 to the client terminals 1-1 to 1-i again via the caching module 42, HTTP module 41, layer-7 load balancing device 24 and data routing device 21.

Figure 7A:
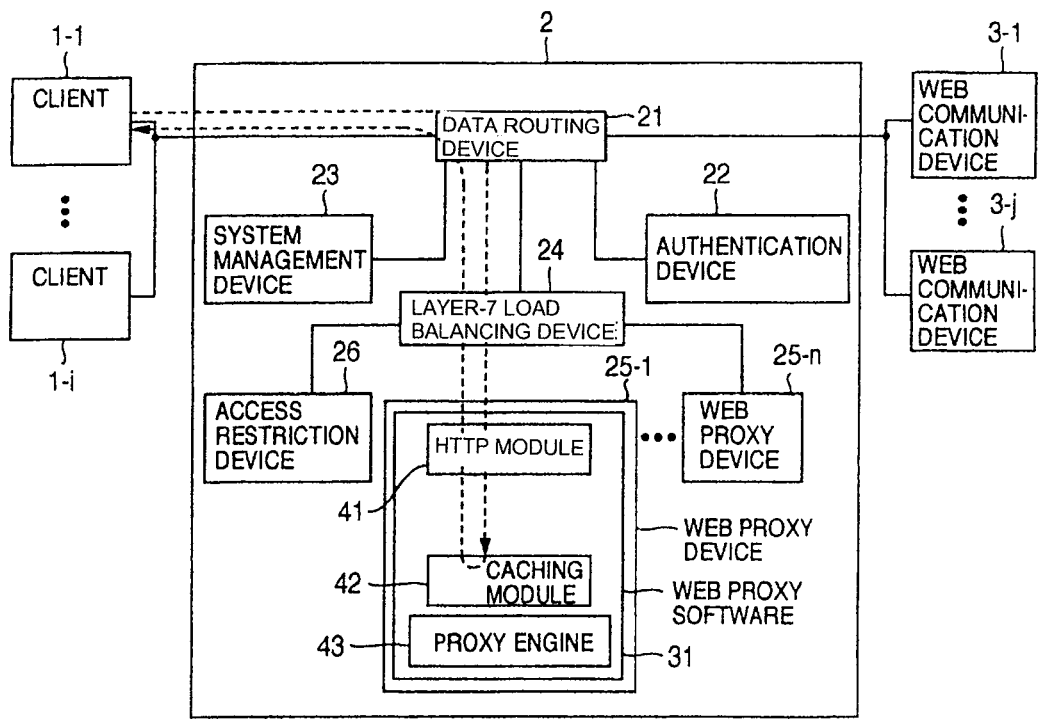
FIGS. 7A and 7B show a diagram and a sequence for explaining when the large scale web proxy apparatus receives a request of contents to be subjected to access limitation, respectively.
Figure 7B:
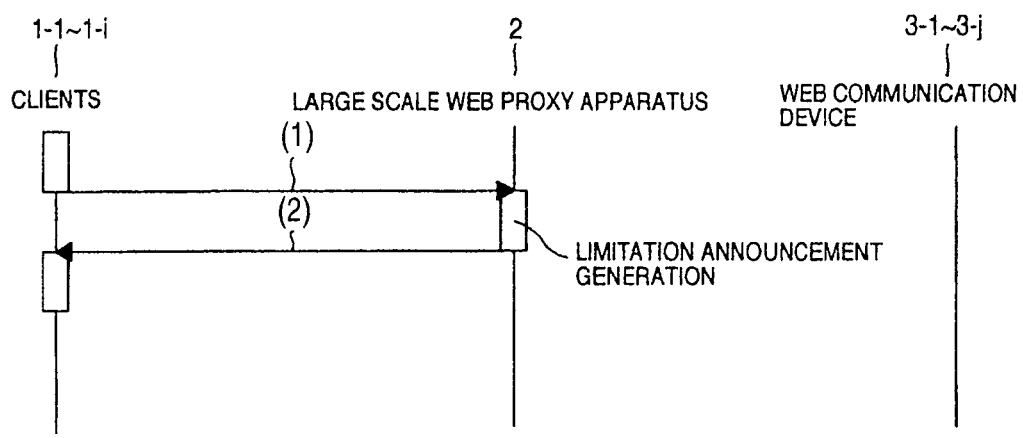

FIG. 7 shows a diagram and sequential diagram for explaining the operation of the large scale web proxy apparatus 2 when contents to be subjected to access limitation is required. In this case, the sequential diagram corresponds to arrows shown by dotted lines in the upper diagram.

A request signal (data (1)) containing the contents to be subjected to the access limitation from the client terminals 1-1 to 1-i is first applied to the caching module 42 via the data relay device 21 and layer-7 load balancing device 24 of the large scale web proxy apparatus 2 and via the HTTP module 41 of the web proxy software 31. In this case, the web proxy software 31 generates a limitation announcement indicating that, e.g., the client terminals 1-1 to 1-i request the contents to be subjected to the access limitation. The limitation announcement, which is included in the data (2), is transmitted to the client terminals 1-1 to 1-i. At of the web proxy software 31 to the client terminals 1-1 to 1-i again via the caching module 42, HTTP module 41, layer-7 load balancing device 24 and data routing device 21.

Figure 8:
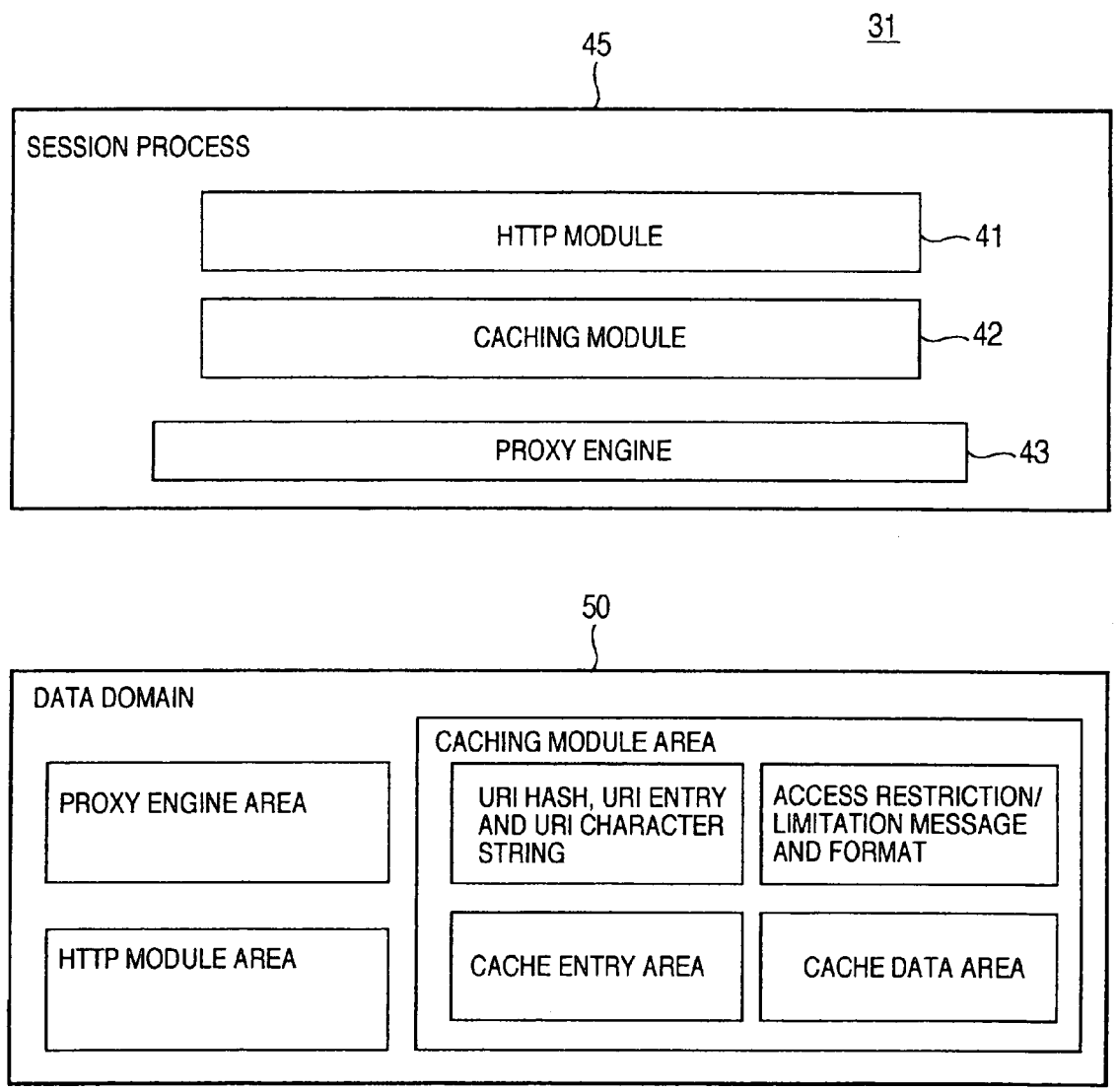
FIG. 8 is a diagram for explaining an internal structure of web proxy software

FIG. 8 is a diagram for explaining the internal structure of the web proxy software 31.

The web proxy software 31 is stored in the main memory 30. The web proxy software 31, for example, includes a data area 50 and a session process 45. The session process 45 contains, e.g., an HTTP module 41, a caching module 42 and a proxy engine 43. The proxy engine 43 implements basic functions of the web proxy software 31 to realize communication data transfer, session management, etc. The HTTP module 41 processes a HTTP packet. The caching module 42 performs HTTP caching operation and congestion control. The data area, e.g., contains a proxy engine area, an HTTP module area and a caching module area. Further, the caching module area, e.g., has a URI (uniform resource identifier) hash, a URI entry, and a URI character string; access restriction/limitation messages, and format; a cache entry area; and a caching data area.

Figure 9:
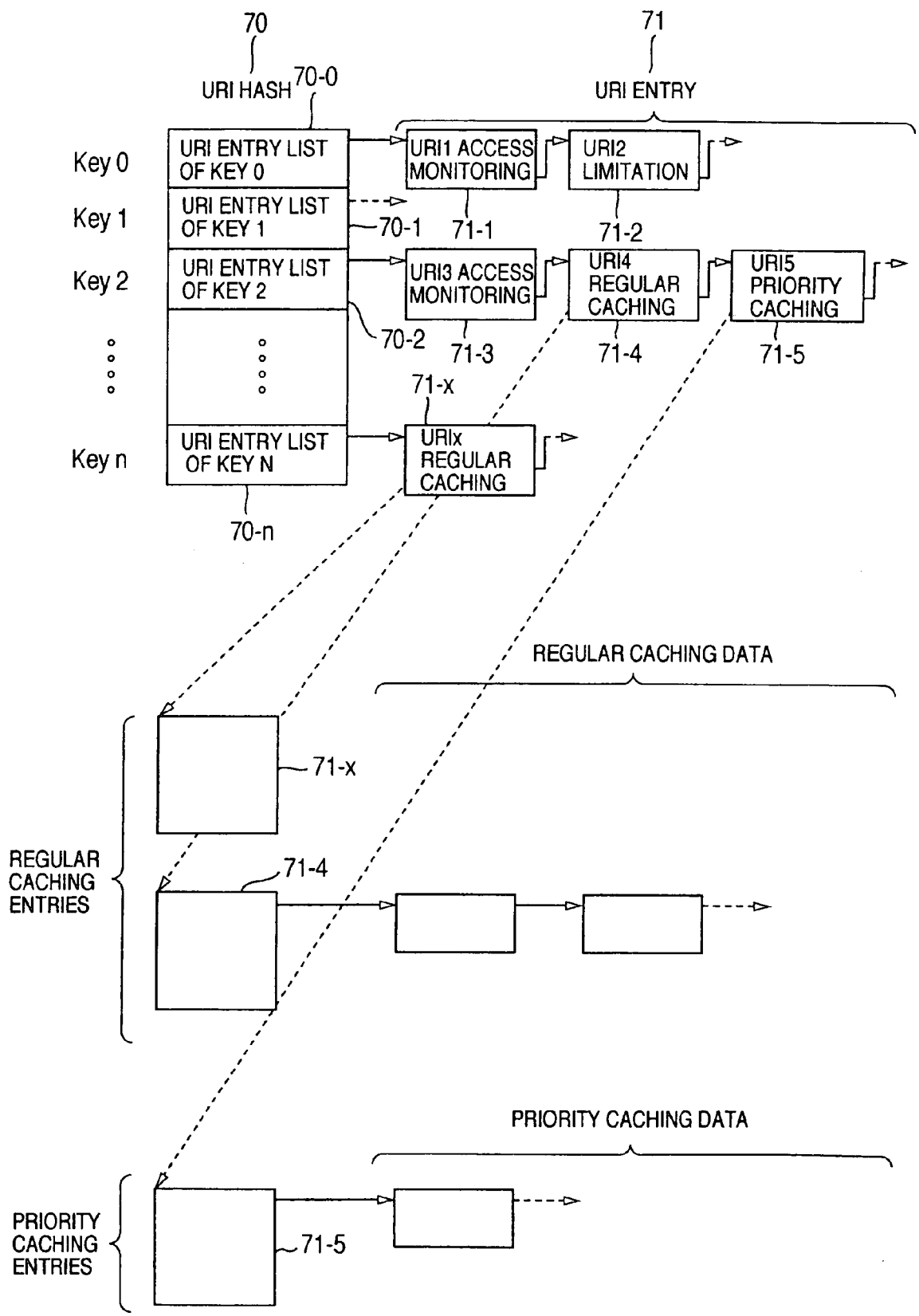
FIG. 9 is a diagram for explaining URI (uniform resource identifier) management based on a URI hash and a URI entry.

FIG. 9 is a diagram for explaining URI management based on a URI hash and a URI entry.

A URI hash 70, e.g., includes URI entry lists 70-1 to 70-n of key 0 to key n.

The URI entry list 70-0 of key 0 contains, e.g., a URI1 (access monitoring) 71-1 and a URI2 (limitation) 71-2 as URI entries 71. The URI entry list 70-2 of key 2 contains, e.g., a URI3 (access monitoring) 71-3, a URI4 (regular cashing) 71-4 and URI5 (priority caching) 71-5 as the URI entries 71. The URI entry list 70-n of key n contains, e.g., a URIx (regular caching) 71-x.

In this case, the URI4 (regular caching) 71-4 and URIx (regular caching) 71-x contain regular caching data in their regular caching entries. Further, URI5 (priority caching) 71-5 contains priority caching data in its priority cache entry.

Explanation will now be made in detail as to URI management. The URI entries, on the basis of a hash key calculated by multiplying URI by a hash function, are managed as listed with an identical hash key. In this example, the URI1 (access monitoring) entry 71-1 and URI2 (limitation) entry 71-2 are listed for the key 0, the URI3 (access monitoring) entry 71-3 and URI4 (regular caching) entry 71-4 are listed for the key 2, . . . and so on. URIs in the list are monitored and restricted, limited, priority cached by an operator instruction or regularly cached. Among these, for example, the entry of URI4 (regular caching) 71-4 as regular caching indicates a specific address of the regular cache entry. Similarly, the entry of URI5 (priority caching) 71-5 as priority caching indicates a specific address of the priority cache entry.

In a caching module area of the web proxy software on the main memory 30, for example, a regular cache entry area, a priority cache entry area and a caching data area are provided as separated with predetermined sizes. The actual contents data of the URI4 (regular caching) 71-4 is stored in a regular cache entry area at an address shown by the cache entry of the URI4 (regular caching) 71-4, and the regular caching data area is added by a necessary amount according to the size of the contents. Similarly, the actual contents data of the URI5 (priority caching) 71-5 is stored in a priority cache entry area at an address shown by the cache entry of the URI5 (priority caching) 71-5, and the priority caching data area is added by a necessary amount according to the size of the contents.

Explanation will then be made as to the caching module area provided in the main memory 30. In this connection, the caching module area may be provided as necessary in a suitable storage other than the main memory 30.

FIGS. 10A and 10B are diagrams for explaining the internal data structure of the caching module area.

The caching module area includes, e.g., a URI entry 71 and a cache entry 72. In this case, the URI entry 71 includes, e.g., URI (such as http://www~/index.html), control type (such as regular caching), access counter (such as 3) and cache entry information.

The cache entry 72 includes, e.g., URI entry information (such as a URI entry of http://www~/index.html), caching state (such as being caching), owner session (such as session No. N), waiting session list (such as session Nos. X and y) and caching data information.

In this connection, the priority caching and regular caching entries are different in the value of cashing entry type but have the same contents. Further, the priority cache entry will not be deleted in the caching module 42 so long as the operator does not issue its request. However, the regular cache entry is deleted when resources become lack.

FIG. 11 is another diagram for explaining the internal data structure of the caching module area.

The caching module area includes, e.g., cache entry information (such as a cache entry of http://www~/index.html), caching data type (such as regular caching), the number (such as 3) of sessions referring to caching data, next caching data information, and caching data.

The priority caching and regular caching data have different values of the contents data type but have the same contents. Further, the priority caching data its request. However, the regular caching data is deleted when resources become lack.

B. Detailed Operation:

Explanation will next be made as to caching and congestion control and avoidance process.

Figure 12:
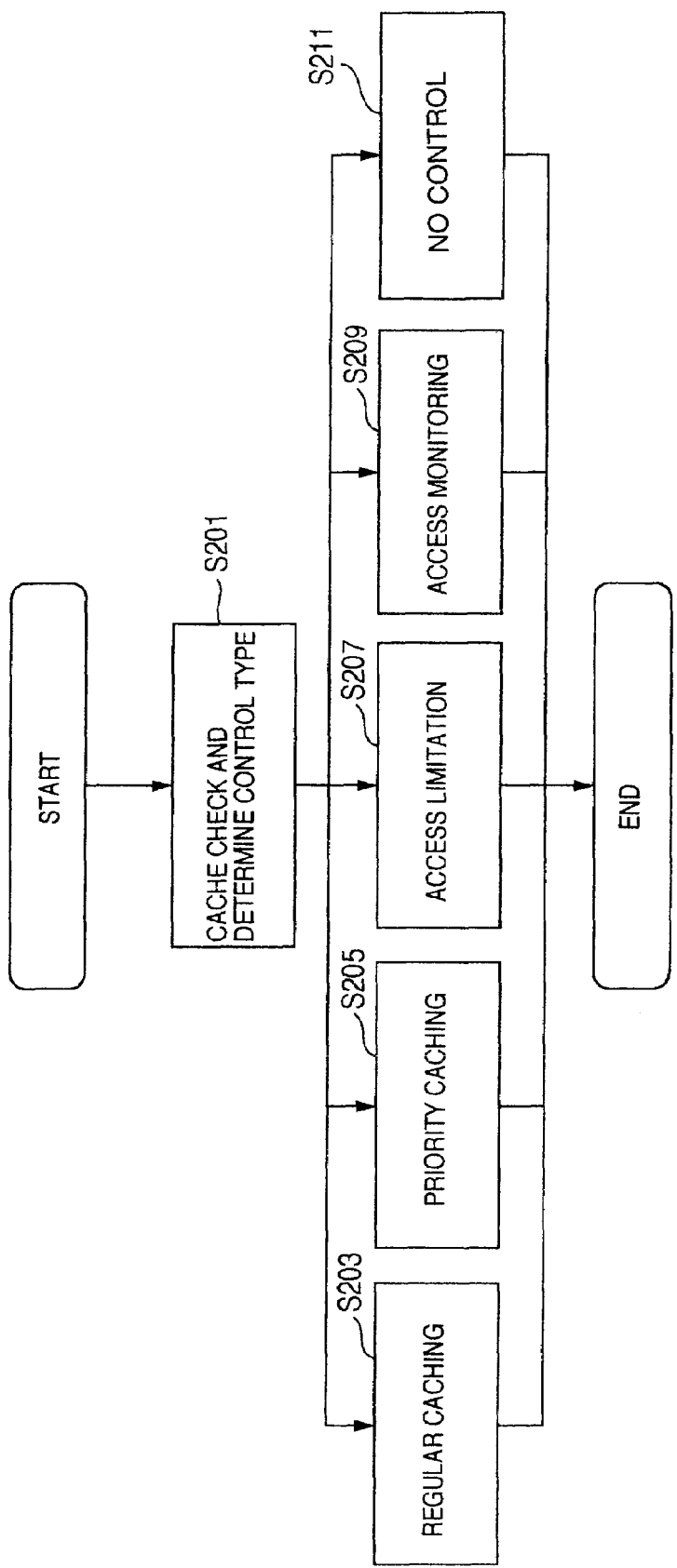
FIG. 12 is a flowchart showing basic operations of a caching process and a congestion control and avoidance process.

FIG. 12 is a flowchart showing basic operations of the caching and congestion control and avoidance process.

First, the web proxy software 31 performs cache check and control type determination (S201). The web proxy software 31, based on the determined result, for example, controls any one or ones of regular caching (S203), priority caching (S205), access limitation (S207), access monitoring (S209) and non-control (S211); and then terminates its operation.

The cache check and congestion control and avoidance process determination will be detailed in the following.

Figure 13:
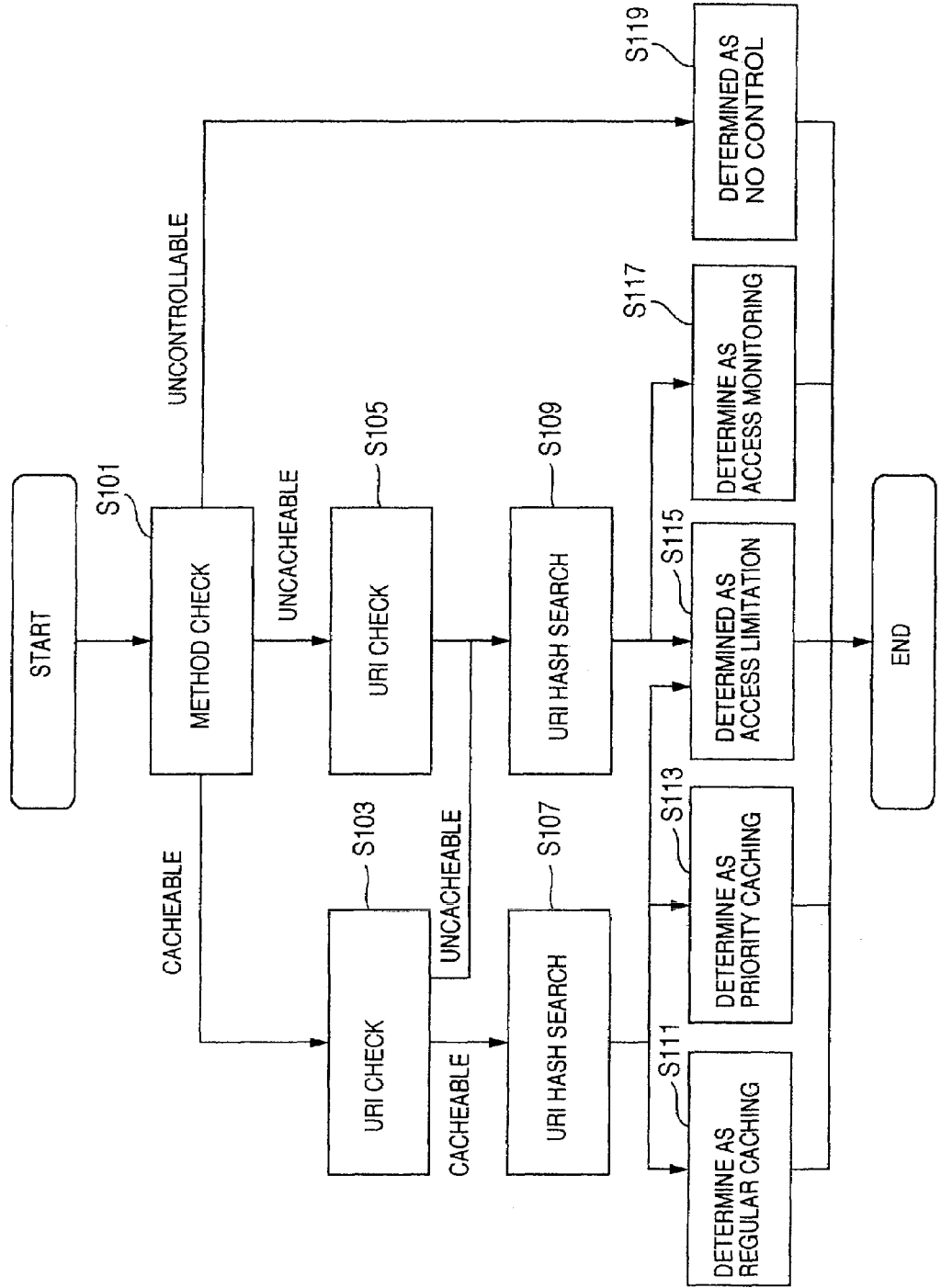
FIG. 13 is a flowchart showing a cache check and a congestion control and avoidance process.

FIG. 13 is a flowchart for explaining the determination of the cache check and congestion control and avoidance process.

The caching module 42 included in the web proxy software 31 first performs method check to determine whether the communication contents is cacheable, uncacheable or controllable (S101). If cacheable, then the caching module 42 performs URI check (1) (S103). If cacheable in the step S103, then the caching module 42 performs URI hash search (1) (S107) to determine any one of the regular caching (S111), priority caching (S113) and access limitation (S115).

If uncacheable in the step S101, then the caching module 42 performs URI check (2) (S105), and further performs URI hash search (2) (S109) to determine an the URI hash search (2) is carried out even when uncacheable in the step S103. When uncontrollable in the method check step S101, the HTTP module 41 or caching module 42 determines to be non-control (S119).

Explanation will now be made as to the details of the aforementioned processes.

(Method Check of Step S101):

In the method check, the web proxy software 31 executes operations which follow.

(1) The software receives a request method of client's HTTP request.

(2) When the request method is now 'GET' or 'HEAD', the software carries out the operation in the case of the 'cacheable'.

(3) When the request method is 'OPTIONS', 'POST', 'DELETE', 'TRACE' or 'CONNECT', the software carries out the operation in the case of the 'uncacheable'.

(4) When the request method is an extension method not defined by RFC2616 (request for comments 2616), the software carries out the operation in the case of the 'uncontrollable'.

Figure 14:
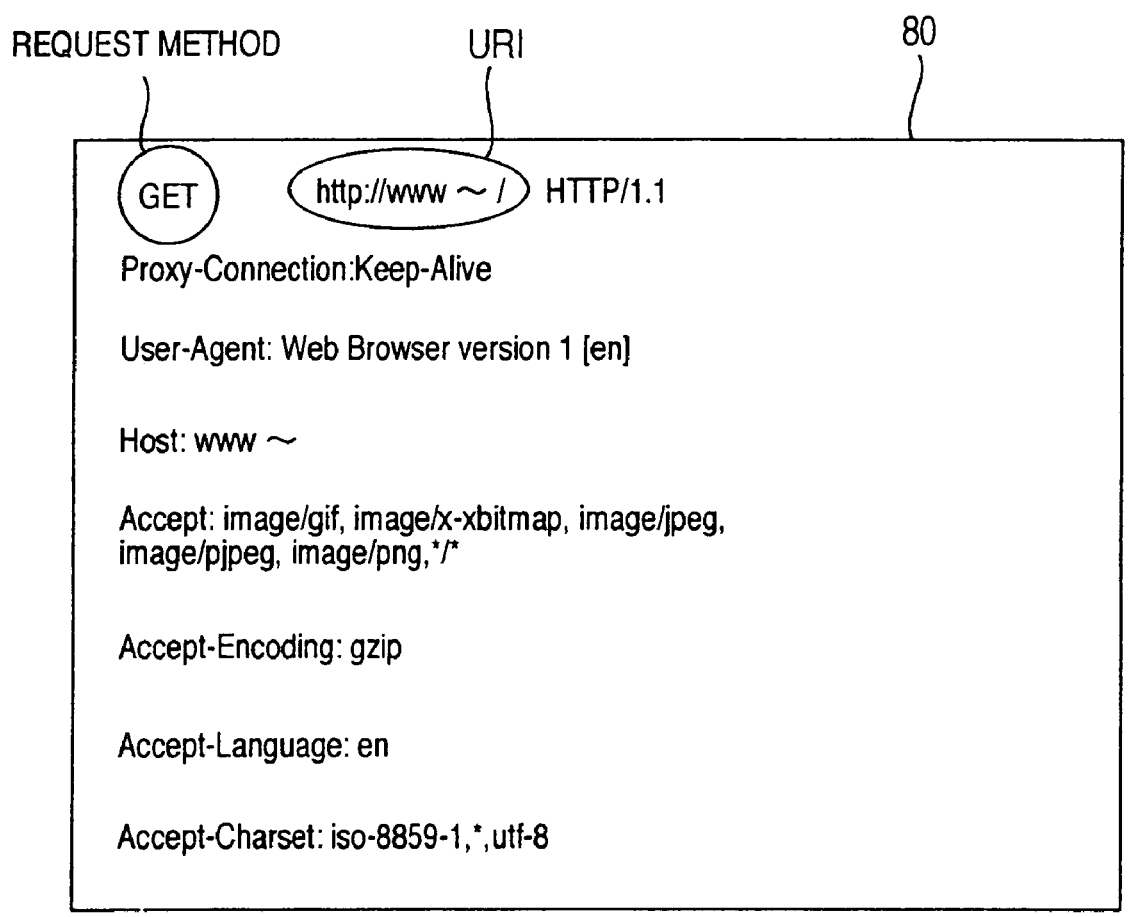
FIG. 14 is a diagram for explaining a client's HTTP request.

FIG. 14 is a diagram for explaining client's HTTP request.

A client's HTTP request 80 includes a request method ('GET' in this example) and a URI (http://www~/ in this example), as exemplified in the drawing. In this example, 'GET' is acquired as a request method in the above operation (1) and the operation is shifted to the 'cacheable' operation.

(URI Checks (1) and (2) of Steps S103 and S105):

(1) The software first confirms that the URI scheme is HTTP.

(2) The software then checks the path to examine whether or not the path includes a character "?".

(3) The software checks the path to determine whether or not the path includes noncacheable content suffix, for example, ".cgi", or ".asp".

(4) Further, the software determines the presence or absence of a query to perform processing operation of removing the query. 'The presence of a query' means that the path has '?'.

(5) When the corresponding characters are present in the (2) or (3), a character string obtained after the 'URI processing' is carried out is stored in the shared memory.

(6) When the corresponding character is present in the operation of (2) or (3), the operation in the case of the 'uncacheable' is carried out; whereas, when no corresponding character is present in the operation of (2) or (3), the operation of the 'cacheable' is advanced.

Figure 15A:
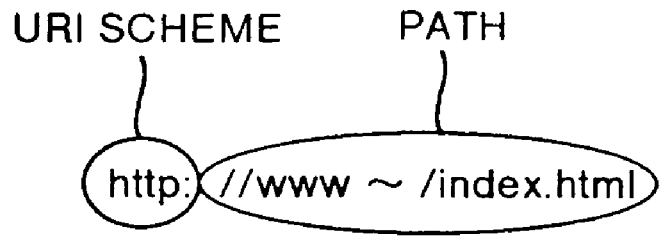
FIGS. 15A and 15B are diagrams for explaining processing of a URI.
Figure 15B:

FIG. 15 shows diagrams for explaining how to process a URI.

As illustrated, a URI (such as http://www~/index.html) has a URI scheme of 'http:' and a path of '//www~/index.html'.

The processing of a URI is, for example, to remove a query attached in the URI (such as http://www~//a.cgi?al=argl&a2=arg2). In this example, the query corresponds to '?al=argl&a2=arg2', and thus the URI is processed into 'http://www~/a.cgi' by removing the '?al=argl&a2=arg2'.

In this way, in the URI check, prior to the URI hash search, dynamically generated content such as a Common Gateway Interface (CGI) is checked. More concretely, the determination is made on the basis of the presence or absence of a file identifier shown in the URI and a parameter (argument) specific to CGI. When the software determines the page has such a CGI as to be dynamically generated, the software performs the argument removing operation to generate a simplified short URI. As a result, the software processes a CGI having various queries not as individual URI's including such various queries but as a single URI, thus enabling the realization of the access monitoring. In the URI check (1), further, the software determines cacheable or uncacheable, together with the aforementioned determination. In the URI check (2), since the software previously knows the URI is uncacheable, the software does not perform the determining operation of cacheable or uncacheable.

(URI Hash Searches (1) and (2) of Steps S107 and S109):

In the URI hash search (1) of the step S107, the software performs operations (1), (2) and (3) which follow. For example, there is a caching area on the memory, a URI communicating with a client terminal is stored on the memory, and its memory table can be used as a URI hash table.

(1) The software searches for the URI hash.

(2) In the case of a URI entry hit, the software refers to the control type of the URI entry and determines the control described in the control type.

(3) When failing to hit a URI entry, the software determines the regular caching operation.

In the URI hash search (2) of the step S109, the software executes operations (1), (2) and (3) which follow.

(1) When failing to perform the 'URI processing operation', the software searches for the URI hash with use of a URI in the HTTP request.

(2) When hitting the URI entry, the software refers to the control flag of the URI entry, and determines the control described in the flag.

(3) When mishitting the URI entry, the software determines the access monitoring operation.

Figure 16:
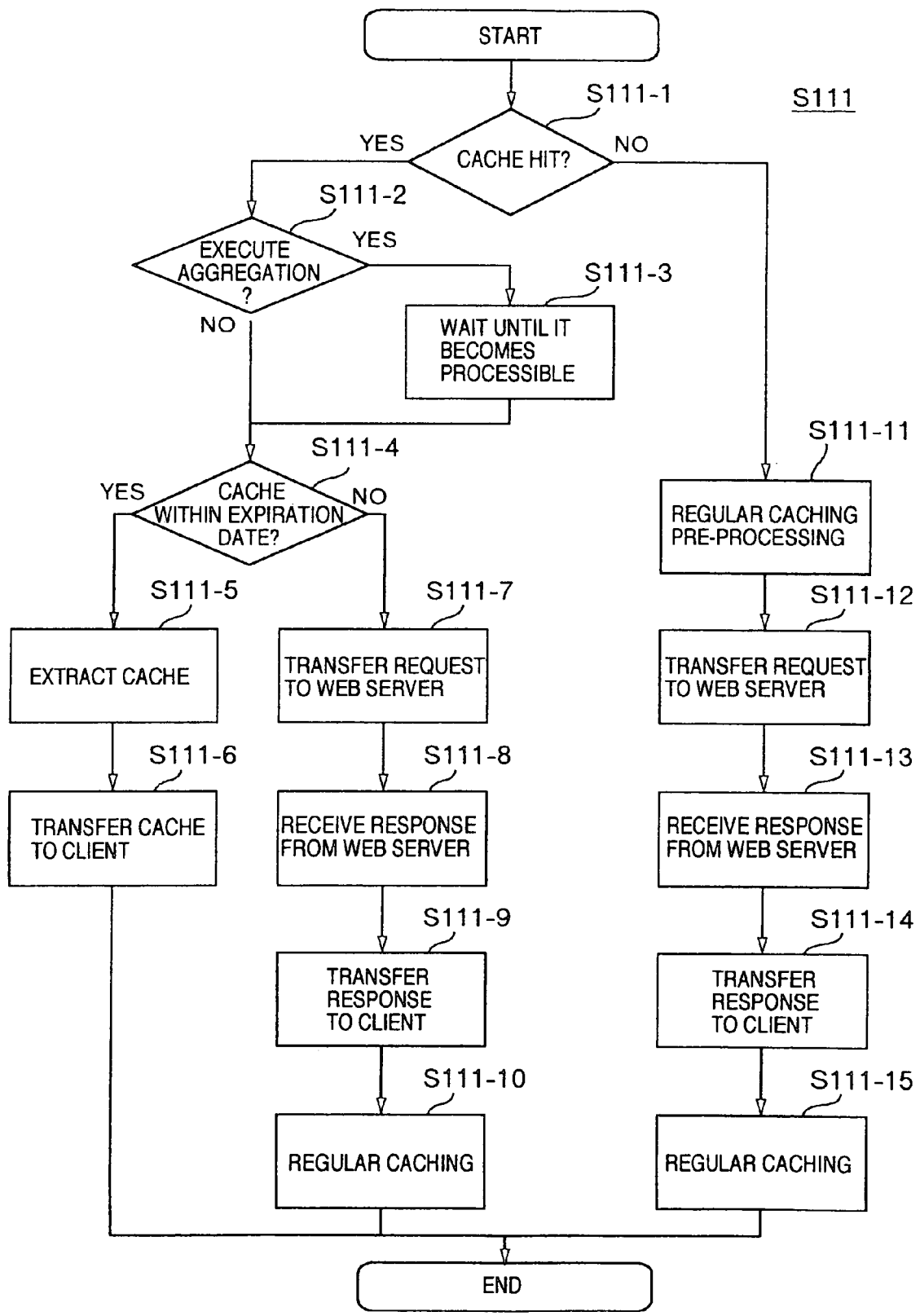
FIG. 16 is a flowchart showing a regular caching process.

(Determination as Regular Caching of Step S111):

FIG. 16 is a flowchart of a regular caching process.

(1) The software first determines the presence or absence of a cache hit (step S111-1).

(1-1) When failing to find a hit, the software shifts the current operation to operation of forwarding the request to the web server as the first access request. The caching module 42 perform regular caching pre-processing operations including, for example, (1) creation of a regular URI entry, (2) creation of a regular cache entry, (3) registration of it in the URI hash, and (4) setting of the owner in the cache entry (step S111-11). Next, the software sends the request to the web server (step S111-12), receives a response from the web server (step S111-13), and then forwards a response to the client (step S111-14). The caching module 42 next performs the regular caching operation (step S111-15). At this stage, in the regular caching operation of the step S111-15, the caching module 42 performs, for example, operations (1) to (6) which follow.

(1) The module reserves regular caching data.

(2) The module copies the response of the web communication device.

(3) The module continues the operations of (1) and (2) so long as there is data.

(4) The module examines the presence or absence of the registered session in a waiting session list.

(5) In the presence of the session in the waiting session list, the module issues a processing start instruction.

(6) The module releases the owner setting.

(1-2) When finding a hit, the software shifts its operation to a request aggregation determining operation (step S111-2). In this case, the caching module 42 has a function of aggregating access requests into a single request for cacheable contents, for example, in order to lighten an access load to the web server. This function is used, when the module receives a plurality of requests for the same contents prior to reception of a response returned from the web server, to forward only the first request to the web server, to keep the remaining requests in a once wait mode and, only after receiving a response to the first request, to resume the operations of the remaining requests. More specifically, the caching module 42 performs the access aggregation in the following manner. In the aggregation determining operation of the step S111-2, (1) the module determines whether or not the cache is already ready for. If the cache is ready, the module goes to "No". (2) The module determines whether or not the owner of the cache entry is the owner associated with the session now being determined. When the owner is the owner of another session, the module goes to "Yes", whereas, otherwise the module goes to "No".

(2) When the request aggregation determination is "Yes", the module stops its operation until the module finishes the operation of the first request relayed to the web server (step S111-3). In the operation of the wait mode, until the module gets resumed to process the operation of the step S111-3, (1) the module registers the session in the waiting session list of the cache entry, and (2) waits for a processing start instruction.

(3) Next, when the module is put in a processible state after the step S111-3 or when no aggregation is executed in the step S111-2, the module moves to cache expiration date determining operation (step S111-4). In the cache expiration date determining operation of the step S111-4, the module calculates an expiration date according to RFC2616 in the cache. If the determination is within the expiration date, then the module proceeds to "Yes", whereas, if the determination is out of the expiration date, then the module proceeds to "No".

When the cache expiration date determination is "Yes", the module extracts the data from the cache (step S111-5). In the cache extraction of the step S111-5, (1) the module makes access to the caching data by a necessary amount. Next, the module transmits the data extracted in the step S111-5 to the client (step S111-6). In this case, since new data is usually cached just before with a high possibility (because the module having waited for the first request to extract the data from the web server, the cache is within the expiration date also with a high possibility. As a result, the number of access requests to the web server can be reduced and the access load can be lightened.

(4) Meanwhile, when the cache expiration date determination is "No", the module transmits the request to the web server (step S111-7), receives a response from the web server (step S111-8), and further forwards the response to the client (step S111-9). Next, the caching module 42 performs regular caching operation (step S111-10).

The module examines the presence or absence of the waiting session even for the first access request in (1-1) in the regular caching operation (step S111-10). If a session or more are registered in the waiting session list, then the module issues an operation restart instruction for the waiting sessions.

In this connection, before the step S111-1, such an access monitoring operation as mentioned above may be added. At this time, as mentioned above, the module first adds an access monitoring pre-processing operation (step S117-1) and thereafter determines whether or not to perform restricting operation (step S117-2). When the module now does not perform the restricting operation, the module proceeds to the step S111-1. When the module performs the restricting operation, on the other hand, the module acquires a restriction message (step S117-3), creates contents based on the restriction message (step S117-4), and transmits the contents to the client (step S117-5). Further, after the steps S111-6, S111-10 and S111-15, an access monitoring post-processing operation (step S117-9) is added and, after executing it, the module terminates its operation.

FIG. 17 is a diagram for explaining an HTTP response of the web communication device.

An HTTP response 85 of the web communication device is included, e.g., in the steps S111-8 and S111-13.

Figure 18:
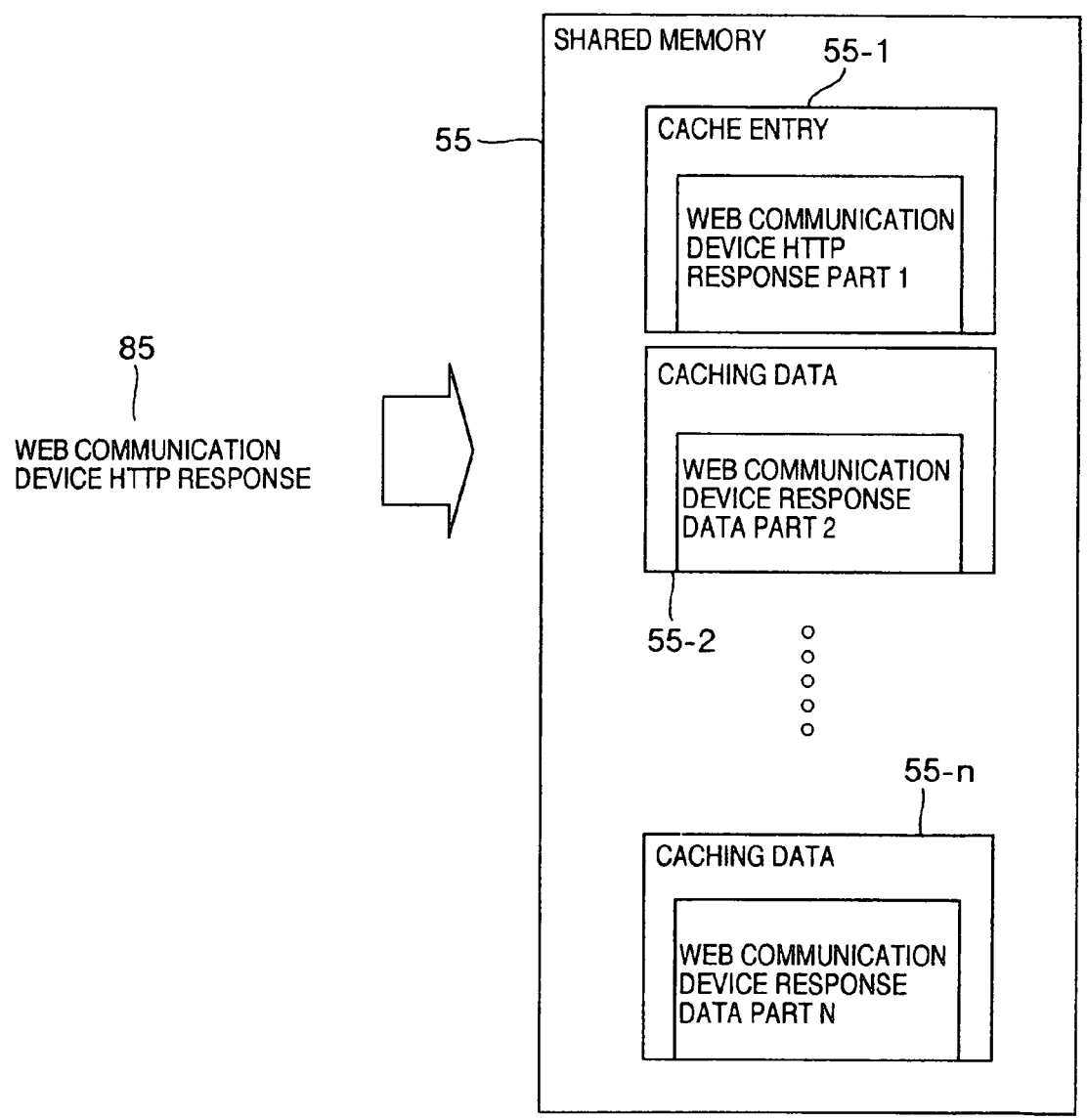
FIG. 18 is a diagram for explaining management of web contents data.

FIG. 18 is a diagram for explaining the management of web contents data.

The caching module 42 in the web proxy software 31 first receives the HTTP response 85 of the web communication device. The caching module 42 divides the HTTP response 85 of the web communication device, for example, into a cache entry 55-1 containing an HTTP response Part 1 of the web communication device, caching data 55-2 containing an HTTP response Part 2 of the web communication device, and caching data 55-$n$ containing an HTTP response Part n of the web communication device; and stores these entry and data in the caching module area.

Figure 19:
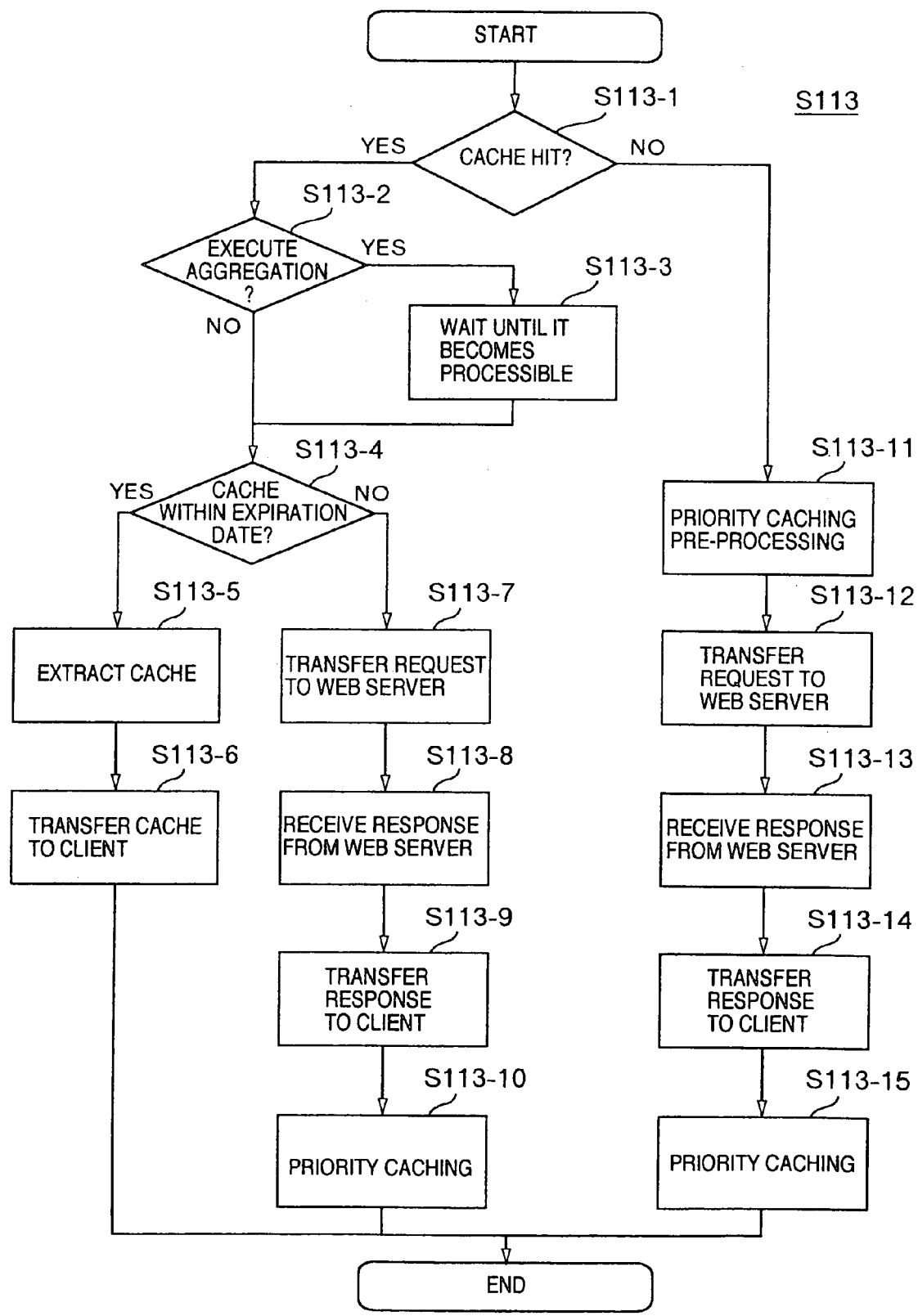
FIG. 19 is a flowchart showing a priority caching process.

(Determination as Priority Caching of Step S113):

FIG. 19 shows a flowchart of a priority caching process. The illustrated flowchart is substantially the same as that of the regular caching operation of the above step S111, except for that the regular caching is modified to the priority caching.

The caching module 42 first determines whether or not the cache is hit (step S113-1). In the case of a cache hit, the module determines whether or not aggregation is to be made (step 113-2). In the aggregation determining operation of the step S113-2, (1) the module determines whether or not the cache is already ready for. If the cache is ready for, the module determines to be "No". (2) The module determines whether or not the owner of the priority cache entry is associated with the session of now performing the determining operation. If the owner is another session, then the module determines to be "Yes". If not then the module determines to be "No".

The caching module 42, when performing aggregation in the step S113-2, waits until the processing becomes enabled (step S113-3). In the operation of the wait mode, the module (1) registers the session in the waiting session list of the cache entry, and (2) waits until the module is called.

Next, the caching module 42 determines whether or not the cache is within the expiration date (step S113-4). In the determination of the cache expiration date of the step S113-4, the module calculates the expiration date as described in RFC2616. If the cache is within the expiration date, then the module goes to "Yes". If not, the module goes to "No". When the cache is within the expiration date, the module obtains the cache (step S113-5). In the cache obtaining of the step S113-5, (1) the module makes access to the cache data by a necessary amount. The caching module 42 then transmits the cache to the client (step S113-6).

When the caching module 42 determines in the step S113-4 that the cache is not within the expiration date, the module forwards the request to the web server (step S113-7), receives a response from the web server (step S133-8), and further forwards the response to the client (step S113-9). Next, the caching module 42 performs the priority caching operation (step S113-10). In the priority caching operation of the step S113-10, the module performs such operations as (1) to reserve priority caching data, (2) to copy the response of the web communication device, (3) to continues the operations of (1) and (2) so long as the data is present, (4) to examine the presence or absence of the registration in the response wait session list, (5), in the presence of a response wait session in (4), to transmit a processing start instruction, and (6) to release the owner setting.

When the cache is not hit in the step S113-1, the caching module 42 performs regular caching pre-processing operation (step S113-11). The priority caching pre-processing operation of the step S113-13 includes, for example, (1) creation of a priority URI entry, (2) creation of a priority cache entry, (3) registration to the URI hash and (4) setting of an owner for the priority cache entry.

After the step S113-11, the caching module 42 forwards the request to the web server (step S113-12), receives a response from the web server (step S113-13), and further forwards the response to the client (step S113-14).

Next, the caching module 42 performs the priority caching operation (step S113-15). In this case, the priority caching operation of the step S113-15 is similar to that of the step S113-10.

In this connection, before the step S113-1, such a monitoring operation as to be explained later may be added. At this time, as will be explained later, the module first executes monitoring pre-processing operation (step S117-1), and thereafter determines whether or not restriction is to be made (step S117-2). When no restriction is executed, the module moves to the step S111-1. When restriction is executed, on the other hand, the module acquires a restriction message (step S117-3), creates contents based on the restriction message (step S117-4), and forwards the contents to the client (step S117-5). Further, after the steps S113-6, S113-10 and S113-15, an access monitoring post-processing operation (step S117-9) is added and, after executing the operation, the module terminates it operation.

(Determination as Access Limitation of Step S115):

As a method for creating access limitation contents, the module, for example, prepares the access limitation message and the format of the access limitation contents to dynamically generate the access limitation contents. For example, a group of access limitation messages and the format of limitation contents are previously stored in the caching module area. The caching module 42 creates access limitation contents by extracting a suitable message according to the state and inserting it in the format of the access limitation contents. For example, as shown in a drawing to be given later, with use of a message 93 of "Required message cannot be available", the module inserts it in the format of the access limitation message to generate access limitation contents.

FIG. 20 is a flowchart of an access limitation processing.

The caching module 42 first acquires a limitation message (step S115-1), creates contents based on the limitation message (step S15-2), and then forwards the contents to the client (step S115-3).

Figure 21A:
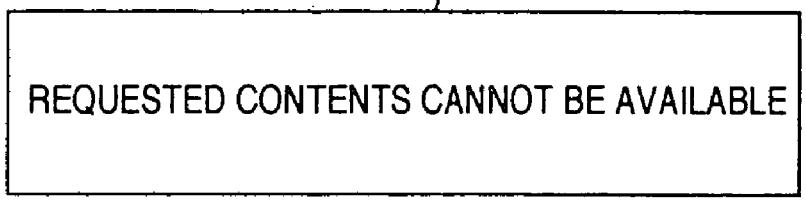
FIGS. 21A and 21B are diagrams for explaining a limitation message and limitation contents, respectively.
Figure 21B:
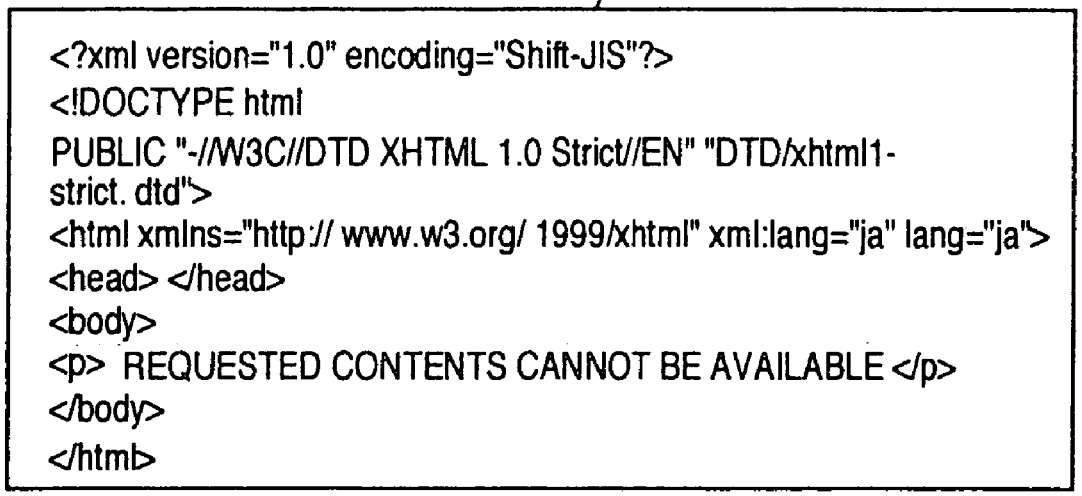

FIG. 21A shows a limitation message and FIG. 21B shows limitation contents.

A limitation message 91 is expressed, e.g., as "Requested contents cannot be used". Limitation contents 93 is expressed, e.g., as illustrated.

Figure 22:
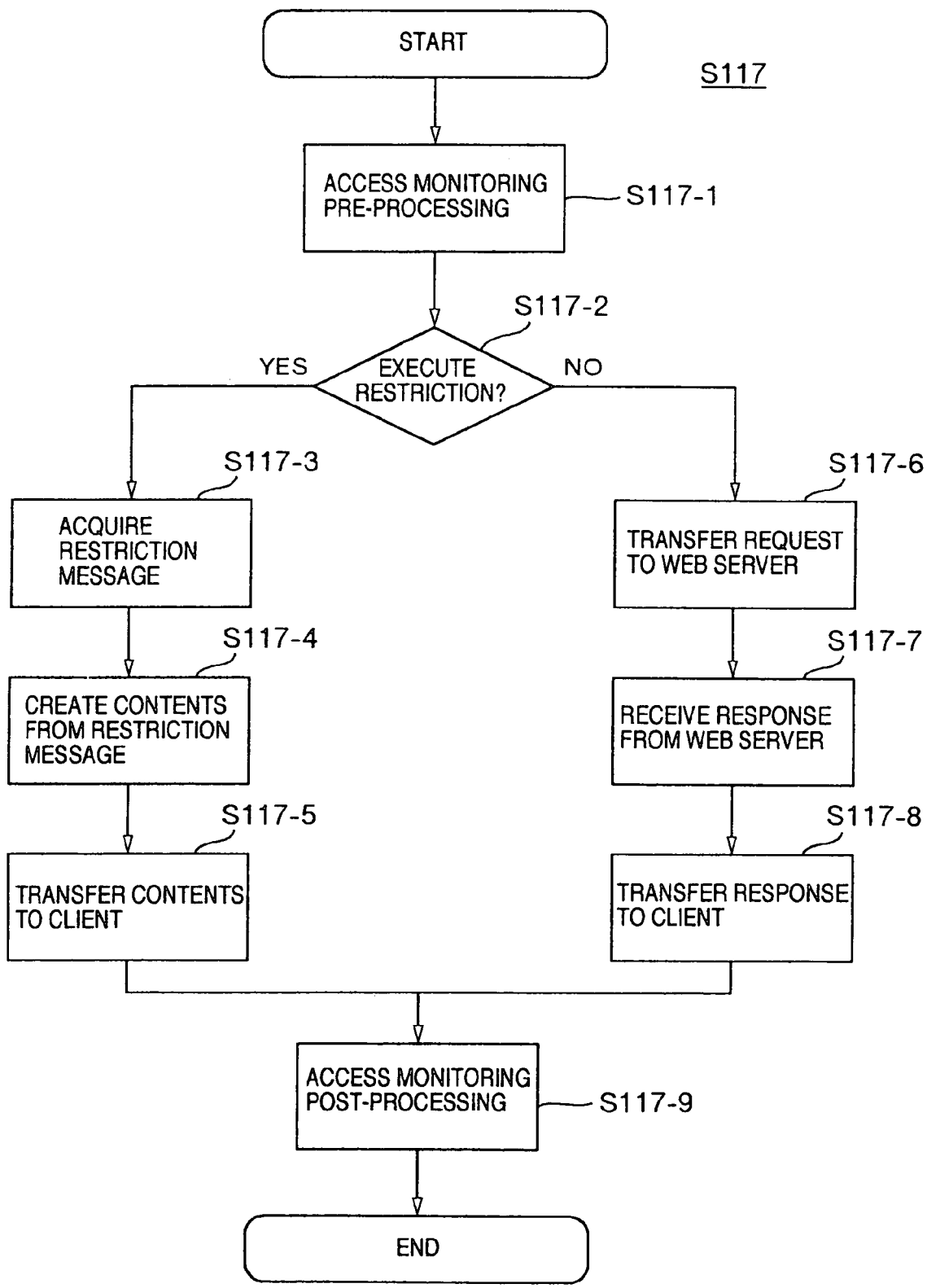
FIG. 22 is a flowchart showing an access monitoring process.

(Determination as Access Monitoring of Step S117):

FIG. 22 is a flowchart of an access monitoring processing.

The caching module 42 first performs monitoring pre-processing operation (step S117-1). In the monitoring pre-processing operation of the step S117-1 includes:

(1) If failing to create the URI entry, then the module creates it.

(2) When executing the operation of (1), the module registers it in the URI hash (3) The module increments an access count in the URI entry by 1.

Next, the caching module 42 determines whether or not restriction is to be made (step S117-2). In the restriction determining operation of the step S117-2, the module refers to (1) the access counter of the URI entry, (2) the restriction execution flag of the URI entry, (3) the number of restriction start connections set for the device and (4) the number of restriction end connections set for the device. If the restriction execution flag of (2) is not set and (1)>(3), then the modules goes to "Yes"; while, otherwise, the module goes to "No". On the other hand, if the restriction execution flag of (2) is set and (1)>(4), then the modules goes to "Yes"; while, otherwise, the module goes to "No".

When performing the restriction in the step S117-2, the caching module 42 acquires a restriction message (step S117-3), creates contents based on the restriction message (step S117-4), and forwards the contents to the client (step S117-5). Meanwhile, when performing no restriction in the step S117-2, the caching module 42 transmits the request to the web server (step S117-6), receives a response from the web server (step S117-7), and forwards the response to the client (step S117-8).

After the steps S117-5 and S117-8, the caching module 42 also performs access monitoring post-processing operation (step S117-9). The access monitoring post-processing operation of the step S117-9 includes following operations (1) to (3).

(1) The module decrements the access count in the URI entry by 1.

(2) When the access counter is "0", the module deletes it from the URI hash.

(3) When performing the deleting operation in (2), the module deletes the URI entry.

FIG. 23A and FIG. 23B show a restriction message and restriction contents, respectively.

Even a method for creating an restriction message is similar to a method for creating access limitation contents. A restriction message 95 is expressed, for example, as "Access later because we are in congestion".

A restriction contents 97 is expressed, for example, as illustrated.

In this connection, the caching module 42, for example, may perform operations A, B and C which follow in the step S117-2 to use it as a determination criteria of whether or not to execute restriction.

A. The caching module 42 adds a new parameter in the URI entry.

B. As the parameter, the module inserts an average of response times when the web proxy device transmitted the URI request to the server in the past.

C. When the number of accesses is one or more, the module also considers the parameter added in A. For example, when a certain number of accesses are present and the communication may be considered to possibly require a time exceeding a set time, the module executes restriction even when the connection number does not reach the aforementioned number of restriction start connections.

Figure 24:
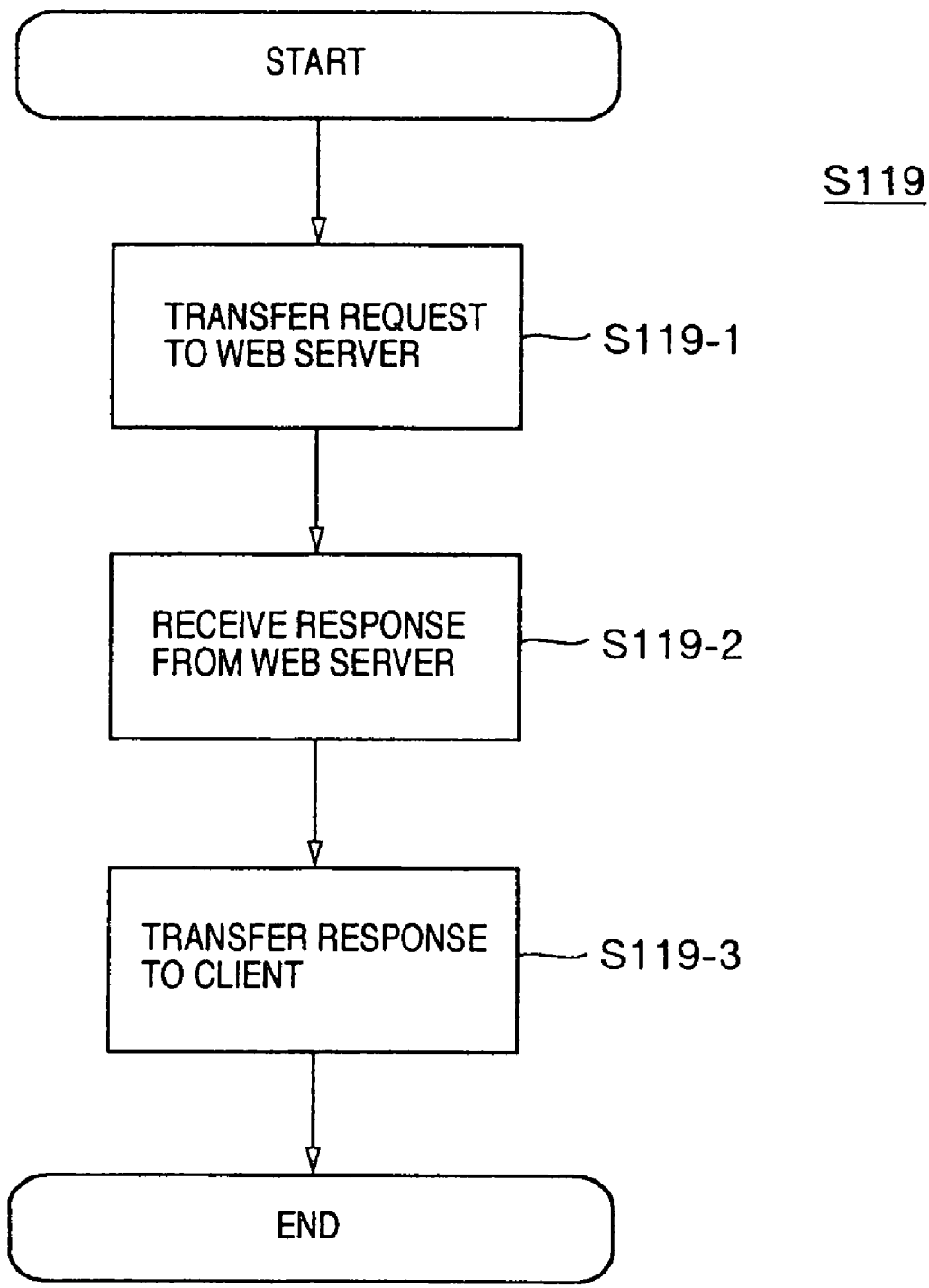
FIG. 24 is a flowchart showing a non-control process.

(Determination as Non-Control of Step S119):

FIG. 24 is a flowchart of a non-control process.

The caching module 42 first forwards a request to the web server (step S119-1), receives a response from the web server (step S119-2), and forwards the response to the client (step S119-3).

Explanation will now be made as to garbage collection (reuse of resources in the device). When the cache area becomes fully occupied, the module performs garbage collecting operation to erase an area having old data stored therein or an area having a smaller access frequency and to reuse it. In the garbage collecting operation, the module performs addition determination of treating the priority cache entry as a non-target, and further treating a data area being used as the priority caching also as non-target by referring to the priority caching flag.

When the communication system is not capable of handling a request method not defined in RFC2616, the system can produce the effects of the present invention without provision of non-control (steps S119 and S211). When the communication system does not process a HEAD method as a cache, the system can cope with it by processing the operation of the HEAD method in the step S101 not in (2) but in (3).

Explanation will be made in the following as to when the system dynamically changes the number of restriction start connections and the number of restriction end connections for use in the access monitoring operation.

FIG. 25 shows an extended URI entry.

When a URI entry is extended as shown in FIG. 25, as the number of restriction start connections and the number of restriction end connections for use in the access monitoring operation, not preset values in the device but dynamically changed values can be used. For example, the next-time number of restriction start connections and the next-time number of restriction end connections are determined by a restriction start time and a restriction end time.

FIG. 26 is a diagram for explaining dynamic change of the number of restriction start connections and the number of restriction end connections.

The drawing shows an example of dynamically determining the number of restriction start connections and the number of restriction end connections, showing changes in the numbers of connections for URI1 and URI2. In this case, both of the URI1 and URI2 utilize such a URI entry as shown in FIG. 25, wherein the number of restriction start connections and the number of restriction end connections are set at their initial connection values respectively. In FIG. 26, control of access restriction of the URI1 and UIR2 is started at a time t1. In this example, when the restriction is started, the restriction start time t1 is stored in the respective URI entries. After the restriction ends, the system find a restriction implementation time by using the restriction start time t1 and restriction end times t2 and t3. A restriction implementation time T1 of the URI1 is t2-t1, and a restriction implementation time T2 of the URI2 is t3-t1. These times are compared with a standard implementation time T assumed by the communication system to determine the next number of restriction start connections and the next restriction end connections. In this example, since the value of T1 is much smaller than the value of T, the restriction start and end connection numbers of the URI1 are increased by a constant value. Since the value of T2 is not so different from the value of T, further, these connection numbers are not changed.

In such a URI entry extended as shown in FIG. 25, the access monitoring operation can be implemented by a different method. An average response time when the web proxy software 31 issued requests to the web communication device 3-1 to 3-$n$ is saved in the proxy engine area of the web proxy software 31. Further, average response times for respective URI's are stored in the URI entries. When there are a constant number of requests for the URI, the system compares the average response time of the entire web proxy software 31 with the average response time of each URI, so that, when the average response time for each URI is remarkably large, congestion can be avoided by performing the access restricting operation.

In accordance with the present invention, the communication carrier can provide a communication system higher in reliability than the prior art to users. Further, users can utilize the communication system with a small wait time and quick response when compared with the prior art.

It should be further understood by those skilled in the art that although the foregoing description has been made on embodiments of the invention, the invention is not limited thereto and various changes and modifications may be made without departing from the spirit of the invention and the scope of the appended claims.

What is claimed:

1. A congestion control and avoidance method in a communication relay device provided between a client terminal and a server device, wherein, in response to a request from the client terminal:

when there is a cache hit, the communication relay device transmits requested data already stored in the communication relay device to the client terminal; and when there is a cache miss or when the request is of a kind that does not utilize cache memory, the communication relay device receives requested data from the server device and then transmits the received requested data to the client terminal; the method comprising:

a step of determining whether the requested data is cacheable or uncacheable, based on said request from the client terminal;

a Uniform Resource Identifier (URI) check step of checking a URI in said requested data from the client terminal, when it is determined that the requested data is uncacheable;

a URI hash search step of searching a URI hash to determine to execute an access limitation operation or an access monitoring operation; and a step of executing either said access limitation operation or said access monitoring application, based on the determination made in the URI hash search step.

2. A congestion control and avoidance method according to claim 1, further comprising:

a step of, when it is determined that the request contents is uncontrollable in the method check step, performing no control.

3. A congestion control and avoidance method according to claim 2, wherein the step of performing no control includes a substep of:

transferring the request to a server device, a substep of receiving a response from the server device, and a substep of transferring the response to the client terminal.

4. A congestion control and avoidance method according to claim 1, wherein the URI hash search step includes:
   a substep of searching the URI hash;
   a substep of, when a URI entry hits, referring to an indication of a type of control to be executed included in the URI entry and executing the type of control as indicated in the URI entry; and
   a substep of, when the URI entry mishits, executing a predetermined operation.

5. A congestion control and avoidance method according to claim 4, wherein the URI entry includes a URI, the indication of the type of control to be executed and an access counter.

6. A congestion control and avoidance method according to claim 1, wherein the access limitation operation includes:
   a substep of obtaining a limitation message relating to requested contents,
   a substep of creating contents based on the limitation message,
   a substep of creating contents based on the limitation message, and
   a substep of transferring the contents thus created to the client terminal.

7. A congestion control and avoidance method according to claim 1, wherein the access monitoring operation includes:
   a restriction determining substep of determining whether or not a restriction is to be executed;
   a substep of, when executing the restriction, obtaining a restriction message, creating contents based on the restriction message and transferring the contents thus created to the client terminal; and
   a substep of, when the restriction is not to be executed, transferring the request to the server device and transferring a response received from the server device to the client terminal.

8. A congestion control and avoidance method according to claim 7, wherein the restriction determining substep includes:
   a substep of, referring to an access counter of the URI entry, a restriction execution flag of the URI entry, a number of restriction start connections set for a device and a number of restriction end connections set for the device, executing the restriction when a value of the access counter of the URI entry exceeds the number of restriction start connections and not executing the restriction when the value of the access counter of the URI entry does not exceed the number of restriction start connections when the restriction execution flag of the URI entry is not set, and executing the restriction when the value of the access counter of the URI entry exceeds the number of restriction end connections and not executing the restriction when the value of the access counter of the URI entry does not exceed the number of restriction end connections when the restriction execution flag of the URI entry is set.

9. A congestion control and avoidance method according to claim 7, further comprising a step of:
   executing a monitoring post-processing operation which decrements the access counter by one in the URI entry, and then deleting the URI entry from the URI hash; and deleting the URI entry.

* * * * *